United States Patent
Matsui

(10) Patent No.: US 12,061,665 B2
(45) Date of Patent: Aug. 13, 2024

(54) INVERSE ELEMENT ARITHMETIC APPARATUS AND MEMORY SYSTEM

(71) Applicant: Kioxia Corporation, Tokyo (JP)

(72) Inventor: Hajime Matsui, Yokohama (JP)

(73) Assignee: Kioxia Corporation, Tokyo (JP)

( * ) Notice: Subject to any disclaimer, the term of this patent is extended or adjusted under 35 U.S.C. 154(b) by 744 days.

(21) Appl. No.: 17/197,256

(22) Filed: Mar. 10, 2021

(65) Prior Publication Data
US 2022/0083624 A1    Mar. 17, 2022

(30) Foreign Application Priority Data

Sep. 11, 2020  (JP) ................................. 2020-153341

(51) Int. Cl.
| | | |
|---|---|---|
| G06F 17/16 | (2006.01) | |
| G06F 7/50 | (2006.01) | |
| G06F 21/64 | (2013.01) | |
| G06F 21/78 | (2013.01) | |
| G06F 21/79 | (2013.01) | |
| H04L 9/32 | (2006.01) | |

(52) U.S. Cl.
CPC .............. *G06F 17/16* (2013.01); *G06F 7/50* (2013.01); *G06F 21/64* (2013.01); *G06F 21/78* (2013.01); *G06F 21/79* (2013.01); *H04L 9/3252* (2013.01)

(58) Field of Classification Search
CPC . G06F 17/16; G06F 7/50; G06F 21/79; G06F 7/721
USPC ........................................................ 708/200
See application file for complete search history.

(56) References Cited

U.S. PATENT DOCUMENTS

| 6,763,366 B2 | 7/2004 | Hars et al. |
| 7,831,651 B2 | 11/2010 | Kobayashi et al. |
| 2005/0283514 A1 | 12/2005 | Mcivor et al. |
| 2014/0233726 A1* | 8/2014 | Yajima .................... H04L 9/008 380/28 |

FOREIGN PATENT DOCUMENTS

JP    2003-233309 A    8/2003

OTHER PUBLICATIONS

Bernstein et al., "Fast constant-time gcd computation and modular inversion", IACR Transactions on Cryptographic Hardware and Embedded Systems, 2019, 59 pages.

* cited by examiner

*Primary Examiner* — Tan V Mai
(74) *Attorney, Agent, or Firm* — Oblon, McClelland, Maier & Neustadt, L.L.P.

(57) ABSTRACT

According to one embodiment, in an inverse element arithmetic apparatus, a word unit processing unit, as approximate calculation loop for extended binary GCD process, iterates a first loop in a case where a value of |r−s| is a subtraction threshold or more, and is capable of iterating a second loop instead of the first loop in a case where the value of |r−s| is smaller than the subtraction threshold. In the first loop, values of r, s, a, b, m, and n is updated and an update matrix M is generated or updated. In the second loop, the values of m and n are updated without updating the values of r, s, a, b and the update matrix M. The control unit terminates the loop of the inverse element arithmetic process in a case where a loop number of times of the inverse element arithmetic process reaches a number-of-times threshold.

20 Claims, 13 Drawing Sheets

FIG.4A

```
Compute Z=Y⁻¹modX:
U=0, V=1.
m=BitLength(X), n=BitLength(Y).
w=WordSize. // number of bits in a word
t=TrailingSize(w). // number of trailing bits, depending on w
d=⌈(m+n-1)/w⌉.
for (j=0; j<d; j=j+1) begin : loop_j
    m₀=m, n₀=n.
    k=max(m₀, n₀).
    h=k-(w+t).
    a₀=X[w-1:0], b₀=Y[w-1:0]. // lower w bits
    r₀=X[k-1:h], s₀=Y[k-1:h]. // higher (w+t) bits
    M=( 1 0 )
       ( 0 1 ).
    e=0.
    for (i=0; i<w; i=i+1) begin : loop_i
        if (e=0) begin : case_1
            e_i=(k>w+t and a_i is odd and |r_i-s_i|<2ⁱ).
            if (e_i≠0) begin
                e=1.
            end
            if (a_i is even) begin : case_A
                M_i=( 0   1 )
                    ( 1/2 0 ).
                (a_{i+1}, b_{i+1})=(b_i, a_i/2).
                (r_{i+1}, s_{i+1})=(s_i, ⌊r_i/2⌋).
                (m_{i+1}, n_{i+1})=(n_i, m_i-1).
            end else if (b_i is even) begin : case_B
                M_i=( 1 0   )
                    ( 0 1/2 ).
                (a_{i+1}, b_{i+1})=(a_i, b_i/2).
                (r_{i+1}, s_{i+1})=(r_i, ⌊s_i/2⌋).
                (m_{i+1}, n_{i+1})=(m_i, max(0, n_i-1)).
```

FIG.4B

```
            end else if (e_i ? m_i>n_i : r_i>s_i) begin :
                case_C
                M_i=( 0   1    )
                    ( 1/2 -1/2 ).
                (a_{i+1}, b_{i+1})=(b_i, (a_i-b_i)/2).
                (r_{i+1}, s_{i+1})=(s_i, ⌊(r_i-s_i)/2⌋).
                (m_{i+1}, n_{i+1})=(n_i, m_i-1).
            end else begin : case_D
                M_i=( 1    0   )
                    ( -1/2 1/2 ).
                (a_{i+1}, b_{i+1})=(a_i, (b_i-a_i)/2).
                (r_{i+1}, s_{i+1})=(r_i, ⌊(s_i-r_i)/2⌋).
                (m_{i+1}, n_{i+1})=(m_i-1, n_i).
            end
        end else begin : case_2 // e≠0
            M_i=( 1 0 )
                ( 0 1 ).
            if (n_i>k-w) begin
                (m_{i+1}, n_{i+1})=(m_i, n_i-1).
            end else begin
                (m_{i+1}, n_{i+1})=(m_i-1, n_i).
            end
        end
        M=M_iM
        (m, n)=(m_{i+1}, n_{i+1}).
    end
    ( X ) =M( X )
    ( Y )   ( Y ).
    f=(Y<0) ? 1 : 0.
    if (f≠0) begin
        Y=-Y.
        M=( 1 0  )
          ( 0 -1 ) M.
    end
    ( U ) =M( U ) modP.
    ( V )   ( V )
end
Z=V.
```

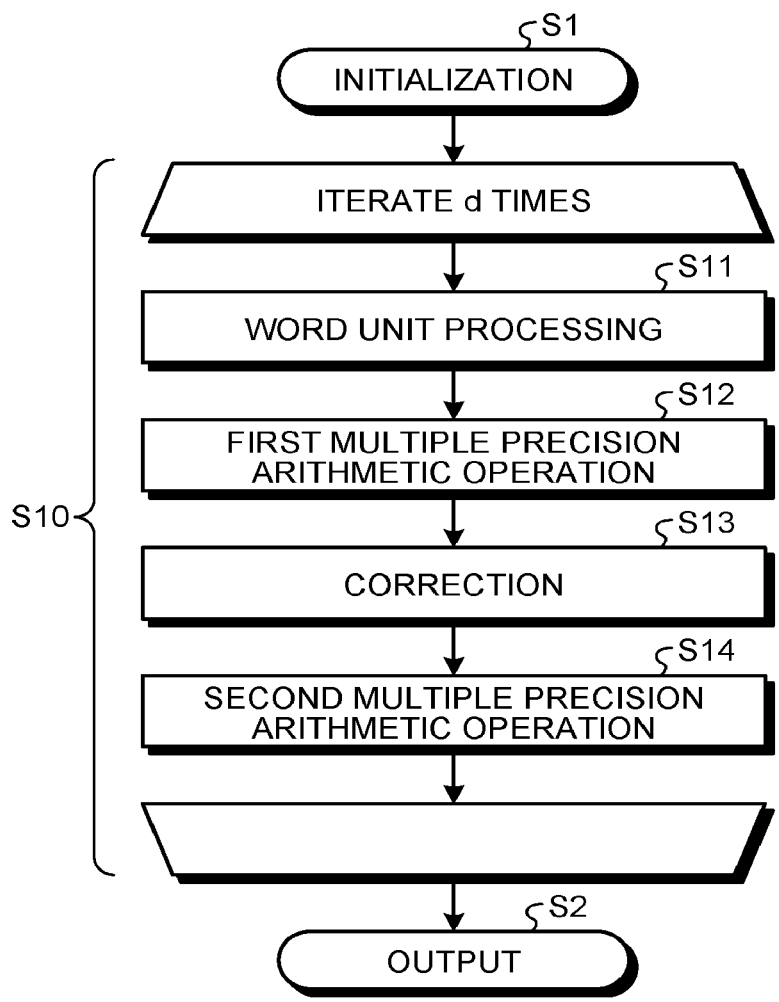

FIG.7A

```
· if (a_i is even) begin : case_A
  · M_i = ( 0    1  )
          ( 1/2  0  ).
  · (a_{i+1}, b_{i+1}) = (b_i, a_i/2).
  · (r_{i+1}, s_{i+1}) = (s_i, ⌊r_i/2⌋).
  · (m_{i+1}, n_{i+1}) = (n_i, m-1).
· end else if (b_i is even) begin : case_B
  · M_i = ( 1    0   )
          ( 0    1/2 ).
  · (a_{i+1}, b_{i+1}) = (a_i, i/2).
  · (r_{i+1}, s_{i+1}) = (r_i, ⌊s_i/2⌋).
  · (m_{i+1}, n_{i+1}) = (m_i, max(0, n_i-1)).           ··· 1221cd
· end else if (e_i ? m_i > n_i : r_i > s_i) begin : case_C
  · M_i = ( 0    1    )
          ( 1/2  -1/2 ).
  · (a_{i+1}, b_{i+1}) = (b_i, (a_i-b_i)/2).
  · (r_{i+1}, s_{i+1}) = (s_i, ⌊(r_i-s_i)/2⌋).
  · (m_{i+1}, n_{i+1}) = (n_i, m-1).
· end else begin : case_D
  · M_i = ( 1     0   )
          ( -1/2  1/2 ).
  · (a_{i+1}, b_{i+1}) = (a_i, (b_i-a_i)/2).
  · (r_{i+1}, s_{i+1}) = (r_i, ⌊(s_i-r_i)/2⌋).
  · (m_{i+1}, n_{i+1}) = (m_i, n_i-1).
· end
```

```
· if (a_i is even) begin : case_A
  · M_i = ( 0    1  )
          ( 1/2  0  ).
  · (a_{i+1}, b_{i+1}) = (b_i, a_i/2).
  · (r_{i+1}, s_{i+1}) = (s_i, ⌊r_i/2⌋).
  · (m_{i+1}, n_{i+1}) = (n_i, m-1).
· end else if (b_i is even) begin : case_B
  · M_i = ( 1    0   )
          ( 0    1/2 ).
  · (a_{i+1}, b_{i+1}) = (a_i, b_i/2).
  · (r_{i+1}, s_{i+1}) = (r_i, ⌊s_i/2⌋).
  · (m_{i+1}, n_{i+1}) = (m_i, max(0, n_i-1)).           ··· 1221cf
· end else begin
  · if (e_i ? m_i > n_i : r_i > s_i) begin : case_C'
    · (μ_2, μ_3) = (1/2, -1/2).
    · b_{i+1} = (a_i-b_i)/2.
    · s_{i+1} = ⌊(r_i-s_i)/2⌋.
    · (m_{i+1}, n_{i+1}) = (n_i, m-1)
  · end else begin : case_D'
    · (μ_2, μ_3) = (-1/2, 1/2).
    · b_{i+1} = (b_i-a_i)/2.
    · s_{i+1} = ⌊(s_i-r_i)/2⌋.
    · (m_{i+1}, n_{i+1}) = (m_i, n_i-1)
  · end
  · if (m > n) begin : case_E
    · (μ_0, μ_1) = (0, 1).
    · a_{i+1} = b_i.
    · r_{i+1} = s_i.
  · end else begin : case_F
    · (μ_0, μ_1) = (1, 0).
    · a_{i+1} = a_i.
    · r_{i+1} = r_i.
  · end
  · M_i = ( μ_0   μ_1 )
          ( μ_2   μ_3 ).
· end
```

```
· U=0, V=1.
· m=BitLength(X), n=BitLength(Y).
· w=WordSize. // number of bits in a word
· t=TrailingSize(w). // number of trailing bits, depending on w
· d=⌈(m+n-1)/w⌉.
· for (j=0; j<d; j=j+1) begin : loop_j
    · m₀=m, n₀=n.
    · k=max(m₀, n₀).
    · h=k-(w+t).
    · a₀=X[w-1:0], b₀=Y[w-1:0]. // lower w bits
    · r₀=X[k-1:h], s₀=Y[k-1:h]. // higher (w+t) bits
    · M=$\begin{pmatrix} 1 & 0 \\ 0 & 1 \end{pmatrix}$.
    · e=0.
    · for (i=0; i<w; i=i+1) begin : loop_i
        ...
      · end
      · $\begin{pmatrix} X \\ Y \end{pmatrix}$=M$\begin{pmatrix} X \\ Y \end{pmatrix}$.
      · f=(Y<0) ? 1 : 0.
      · if (f≠0) begin
          · Y=-Y.
          · M=$\begin{pmatrix} 1 & 0 \\ 0 & -1 \end{pmatrix}$M.
        · end
      · $\begin{pmatrix} U \\ V \end{pmatrix}$=M$\begin{pmatrix} U \\ V \end{pmatrix}$ mod P.
· end
· Z=U.
```

Sections: 11, 121, 122, 123, 124, 125, 13 (grouped as 12)

FIG.9B

```
· U=0, V=1.
· m=BitLength(X), n=BitLength(Y).
· w=WordSize. // number of bits in a word
· t=TrailingSize(w). // number of trailing bits, depending on w
· d=⌈(m+n-1)/w⌉.
· f=0.                                         ~124a
· for (j=0; j<d; j=j+1) begin : loop_j
    · m₀=m, n₀=n.
    · k=max(m₀, n₀).
    · h=k-(w+t).
    · a₀=X[w-1:0], b₀=Y[w-1:0]. // lower w bits
    · r₀=X[k-1:h], s₀=Y[k-1:h]. // higher (w+t) bits
    · M=$\begin{pmatrix} 1 & 0 \\ 0 & 1 \end{pmatrix}$.
    · if (f≠0) begin                            ~124b
        · b₀=-b₀.
        · s₀=~s₀. // bit inversion
        · M=$\begin{pmatrix} 1 & 0 \\ 0 & -1 \end{pmatrix}$.
      · end
    · e=0.
    · for (i=0; i<w; i=i+1) begin : loop_i
        ...
      · end
      · $\begin{pmatrix} X \\ Y \end{pmatrix}$=M$\begin{pmatrix} Y \\ Y \end{pmatrix}$.
      · f=(Y<0) ? 1 : 0.
      · $\begin{pmatrix} U \\ V \end{pmatrix}$=M$\begin{pmatrix} U \\ V \end{pmatrix}$ mod P.
· end
· Z=V.
```

Sections: 11″, 121″, 122, 123, 125, 13 (grouped as 12″)

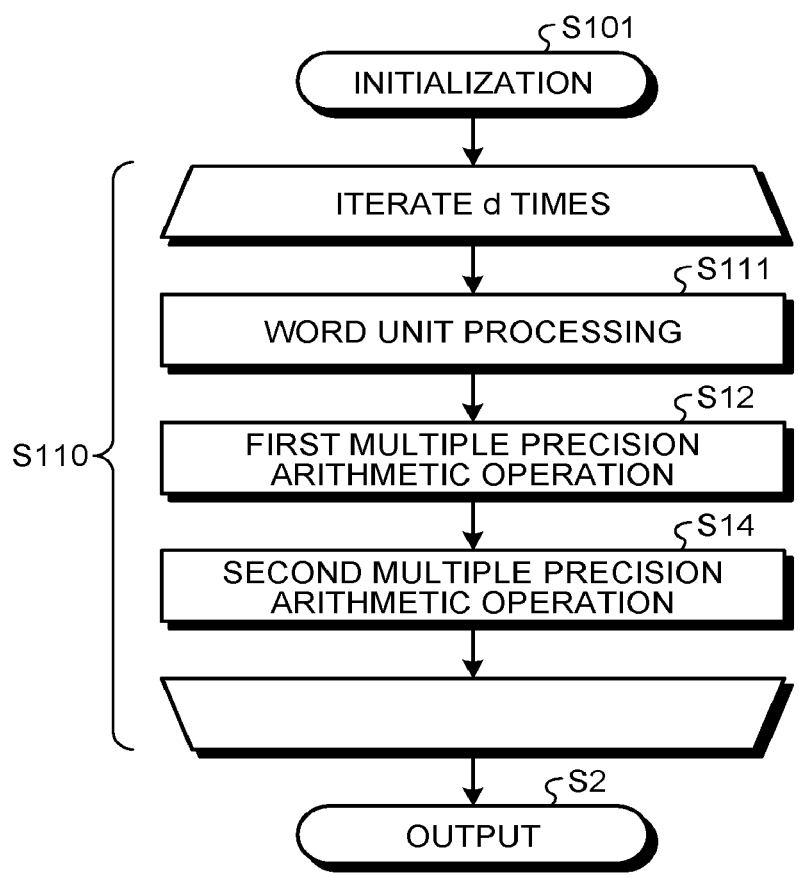

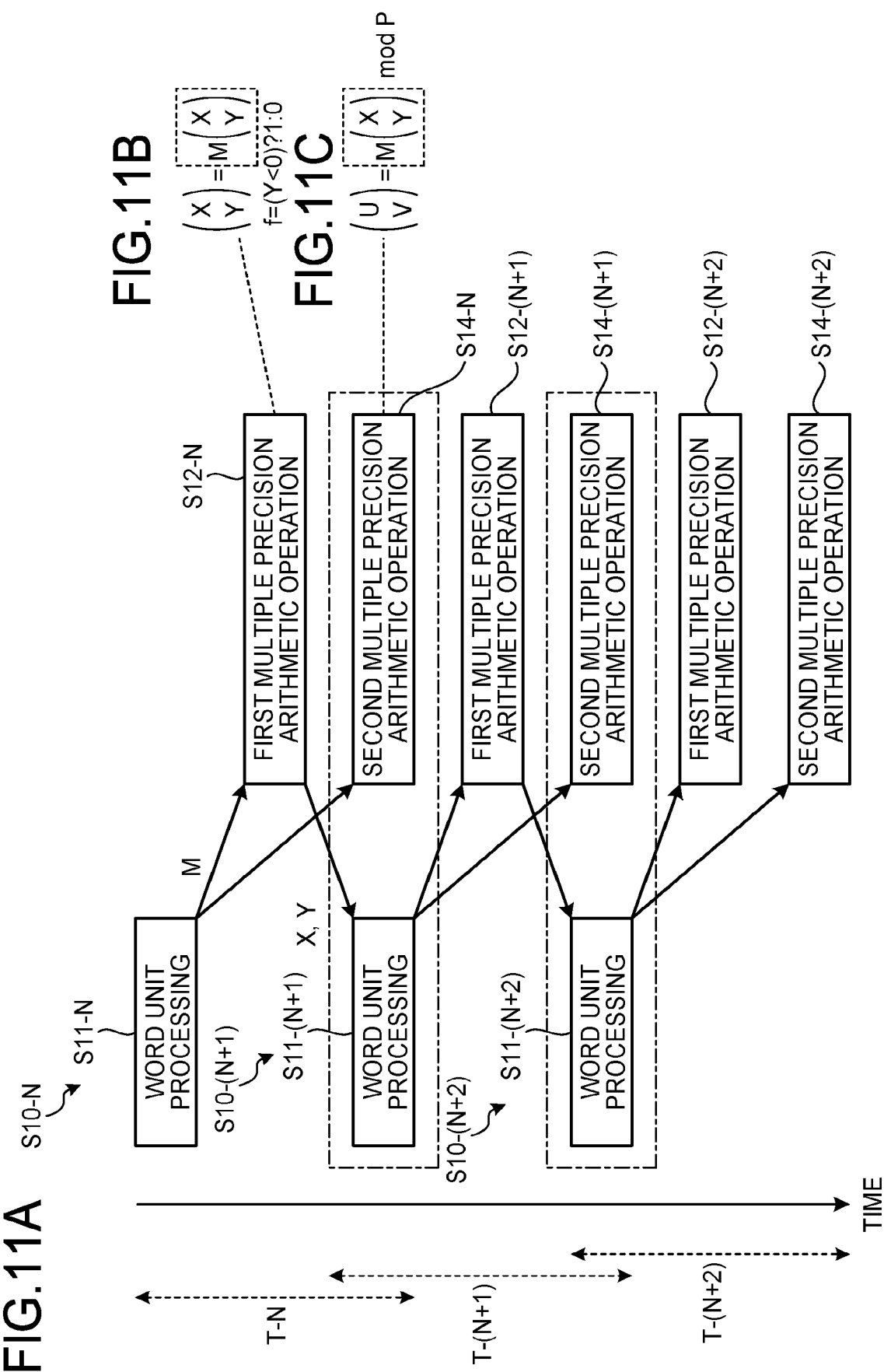

FIG.12

```
Compute Z=Y⁻¹ mod X:
U=0, V=1.
while (Y≠0) begin : loop_j
    X'₀=X, Y'₀=Y.
```

$$M = \begin{pmatrix} 1 & 0 \\ 0 & 1 \end{pmatrix}.$$

c = aribitrary non-negative integer.
for (i=0; i<c; i=i+1) begin : loop_i
    if ($X'_i$ is even) begin : case_A $$M'_i = \begin{pmatrix} 0 & 1 \\ 1/2 & 0 \end{pmatrix}.$$

end else if ($Y'_i$ is even) begin : case_B $$M'_i = \begin{pmatrix} 1 & 0 \\ 0 & 1/2 \end{pmatrix}.$$

end else if ($X'_i > Y'_i$) begin : case_C $$M'_i = \begin{pmatrix} 0 & 1 \\ 1/2 & -1/2 \end{pmatrix}.$$

end else begin : case_D $$M'_i = \begin{pmatrix} 1 & 0 \\ -1/2 & 1/2 \end{pmatrix}.$$

end:

$$\begin{pmatrix} X'_{i+1} \\ Y'_{i+1} \end{pmatrix} = M'_i \begin{pmatrix} X'_i \\ Y'_i \end{pmatrix}.$$

$M = M'_i \, M.$ end

$$\begin{pmatrix} X \\ Y \end{pmatrix} = M \begin{pmatrix} X \\ Y \end{pmatrix}.$$

$$\begin{pmatrix} U \\ V \end{pmatrix} = M \begin{pmatrix} U \\ V \end{pmatrix} \bmod P.$$

end
Z=V.

FIG.13A

```
Compute Z=Y⁻¹modX:
U=0, V=1.
m=BitLength(X), n=BitLength(Y).
w=WordSize. // number of bits in a word
t=TrailingSize(w). // number of trailing bits, depending on w
d=⌈(m+n-1)/w⌉.
for (j=0; j<d; j=j+1) begin : loop_j
    m₀=m, n₀=n.
    k=max(m₀, n₀).
    h=k-(w+t).
    a₀=X[w-1:0], b₀=Y[w-1:0]. // lower w bits
    r₀=X[k-1:h], s₀=Y[k-1:h]. // higher (w+t) bits
    X₀=X, Y₀=Y.
    M=( 1 0 )
      ( 0 1 ).
    e=0.
    c=w.
    for (i=0; i<w; i=i+1) begin : loop_i
        if (e=0) begin : case_1
            e_i=(k>w+t and a_i is odd and b_i is odd and |r_i−s_i|<2ⁱ).
            if (e_i≠0) begin
                e=1.
                c=i+1.
            end
            if (a_i is even) begin : case_A
                M_i=( 0 1 )
                    ( 1/2 0 ).
                q_i=r_i mod2.
                (a_{i+1}, b_{i+1})=(b_i, a_i/2).
                (r_{i+1}, s_{i+1})=(s_i, ⌊r_i/2⌋).
                (m_{i+1}, n_{i+1})=(n_i, m_i-1).
            end else if (b_i is even) begin : case_B
                M_i=( 1 0 )
                    ( 0 1/2 ).
                q_i=s_i mod2.
                (a_{i+1}, b_{i+1})=(a_i, b_i/2).
                (r_{i+1}, s_{i+1})=(r_i, ⌊s_i/2⌋).
                (m_{i+1}, n_{i+1})=(m_i, max(0, n_i-1)).
```

FIG.13B

```
            end else if (e_i ? m_i>n_i : r_i>s_i) begin : case_C
                M_i=( 0 1 )
                    ( 1/2 -1/2 ).
                q_i=(r_i−s_i)mod2.
                (a_{i+1}, b_{i+1})=(b_i, (a_i−b_i)/2).
                (r_{i+1}, s_{i+1})=(s_i, ⌊(r_i−s_i)/2⌋).
                (m_{i+1}, n_{i+1})=(n_i, m_i-1).
            end else begin : case_D
                M_i=( 1 0 )
                    ( -1/2 1/2 ).
                q_i=(s_i−r_i)mod2.
                (a_{i+1}, b_{i+1})=(a_i, (b_i−a_i)/2).
                (r_{i+1}, s_{i+1})=(r_i, ⌊(s_i−r_i)/2⌋).
                (m_{i+1}, n_{i+1})=(m_i, n_i-1).
            end
        end else begin : case_2  // e≠0
            M_i=( 1 0 )
                ( 0 1 ).
            if (n_i>k-w) begin
                (m_{i+1}, n_{i+1})=(m_i, n_i-1).
            end else begin
                (m_{i+1}, n_{i+1})=(m_i-1, n_i).
            end
        end
        M=M_i M
        (m, n)=(m_{i+1}, n_{i+1}).
    end
    ( X_{j+1} )=M_j( X_j )
    ( Y_{j+1} )   ( Y_j ).
    f=(Y<0) ? 1 : 0.
    if (f≠0) begin
        Y=-Y.
        M=( 1 0 )
          ( 0 -1 )M.
    end
    ( U )=M( U )modP.
    ( V )  ( V )
end
Z=V.
```

INVERSE ELEMENT ARITHMETIC APPARATUS AND MEMORY SYSTEM

CROSS-REFERENCE TO RELATED APPLICATIONS

This application is based upon and claims the benefit of priority from Japanese Patent Application No. 2020-153341, filed on Sep. 11, 2020; the entire contents of which are incorporated herein by reference.

FIELD

Embodiments described herein relate generally to an inverse element arithmetic apparatus and a memory system.

BACKGROUND

A memory system equipped with an inverse element arithmetic apparatus sometimes performs signature verification process including inverse element arithmetic operation by the inverse element arithmetic apparatus when reading firmware from a memory. At this time, arithmetic operation of the inverse element is desired to be performed at high speed.

BRIEF DESCRIPTION OF THE DRAWINGS

FIGS. 4A and 4B are diagrams illustrating a pseudocode (algorithm A) of the inverse element arithmetic process in the first embodiment;

FIG. 5 is a flowchart illustrating the inverse element arithmetic process in the first embodiment;

FIGS. 7A and 7B are diagrams illustrating a pseudocode (algorithm B) of inverse element arithmetic process in a second embodiment;

FIGS. 9A and 9B are diagrams illustrating a pseudocode (algorithm C) of inverse element arithmetic process in the third embodiment;

FIG. 10 is a flowchart illustrating the inverse element arithmetic process in the third embodiment;

FIGS. 11A to 11C are sequence diagrams illustrating inverse element arithmetic process in a fourth embodiment;

FIG. 12 is a diagram illustrating a pseudocode (algorithm G) of inverse element arithmetic process corresponding to an extended binary GCD method; and FIGS. 13A and 13B are diagrams illustrating a pseudocode (algorithm A) in which an intermediate variable for proof has been added to the pseudocode of FIG. 4.

DETAILED DESCRIPTION

Figure 1:
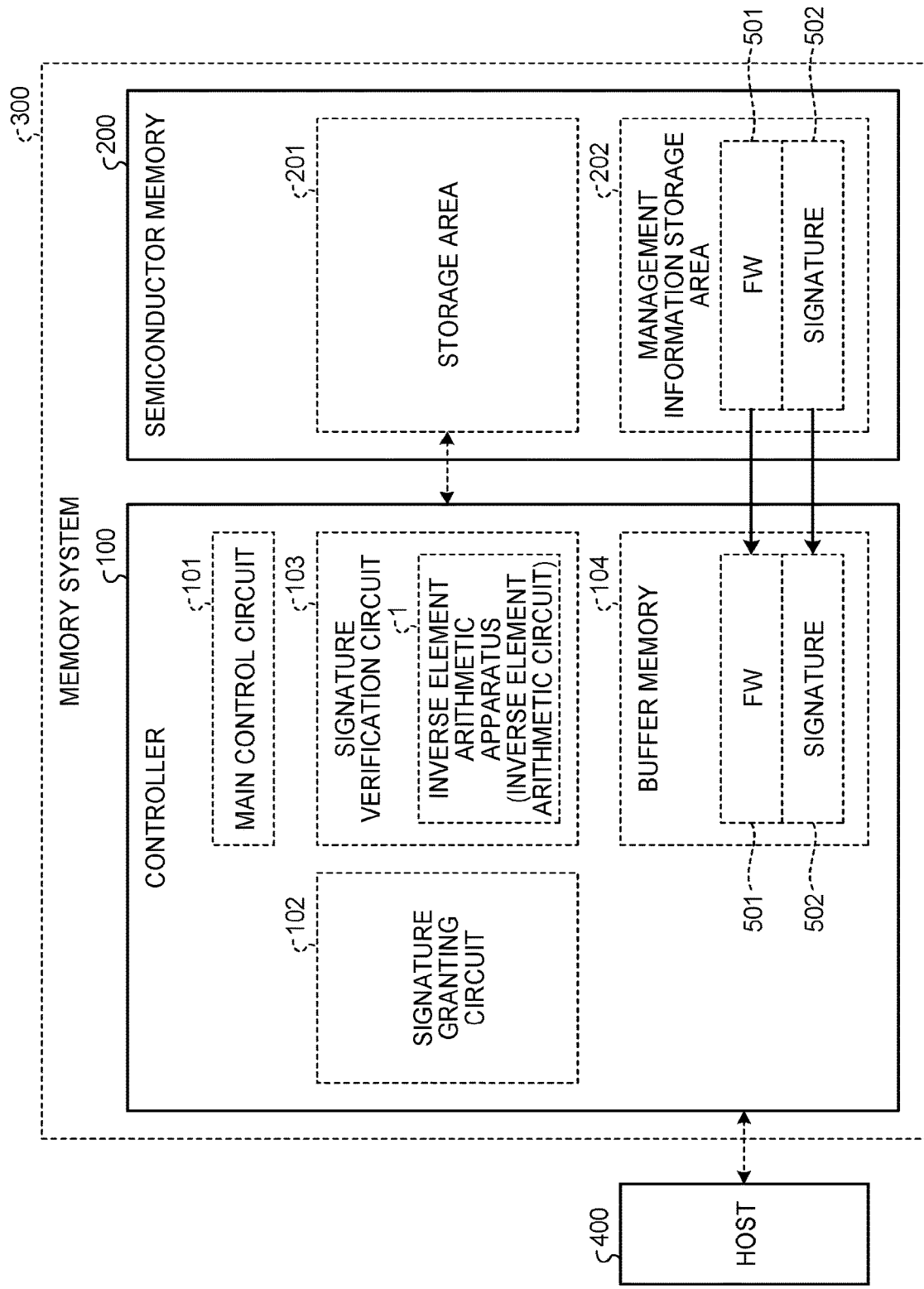
FIG. 1 is a diagram illustrating a configuration of a memory system to which a controller including an inverse element arithmetic apparatus according to a first embodiment is applied.

In general, according to one embodiment, there is provided an inverse element arithmetic apparatus including an initial setting unit, a word unit processing unit, a first multiple precision arithmetic unit, a correction unit, a second multiple precision arithmetic unit, a control unit and an output unit. The initial setting unit receives input of X and Y. The initial setting unit generates m, n and a number-of-times threshold. X and Y represents relatively prime integers. X and Y being is used for inverse element arithmetic process. The inverse element arithmetic process is a process of finding U and V satisfying $UX+VY=1$. m and n indicates effective bit lengths of X and Y. The number-of-times threshold is a threshold determined in accordance with a sum of m and n. The word unit processing unit receives input of X, Y, m and n. The word unit processing unit generates r, s, a and b in accordance with m and n when w and t are predetermined integers. The word unit processing unit, as an approximate calculation loop for extended binary GCD process, iterates a first loop in a case where a value of $|r-s|$ is a subtraction threshold or more, and is capable of iterating a second loop instead of the first loop in a case where the value of $|r-s|$ is smaller than the subtraction threshold. The word unit processing unit terminates the loop of the extended binary GCD process in a case where a total loop number of times of the first loop and the second loop reaches w. m and n are generated in the initial setting unit. r and s indicates high-order w+t bits of X and Y. a and b indicates low-order w bits of X and Y. In the first loop, values of r, s, a, b, m, and n is updated and an update matrix M is generated or updated. In the second loop, the values of m and n are updated without updating the values of r, s, a, and b as well as the update matrix M. The first multiple precision arithmetic unit receives input of X and Y. The first multiple precision arithmetic unit receives the update matrix M updated by the word unit processing unit. The first multiple precision arithmetic unit updates the values of X and Y based on the update matrix M. The first multiple precision arithmetic unit generates or updates f based on positive/ negative of X and Y. The correction unit receives input of X, Y, and f updated by the first multiple precision arithmetic unit and input of the update matrix M updated by the word unit processing unit. The correction unit updates the X, Y, and M so that the values of X and Y are non-negative based on f. The second multiple precision arithmetic unit receives input of the update matrix M updated by the correction unit. The second multiple precision arithmetic unit updates the values of U and V based on the update matrix M. The control unit receives input of the number-of-times threshold generated by the initial setting unit. The control unit iterates a loop of the inverse element arithmetic process that sequentially operates the word unit processing unit, the first multiple precision arithmetic unit, the correction unit, and the second multiple precision arithmetic unit. The control unit terminates the loop of the inverse element arithmetic process in a case where a loop number of times of the inverse element arithmetic process reaches the number-of-times threshold. The output unit outputs $V=Y^{-1} \mod X$ as an inverse element on a quotient ring $Z/XZ$ in response to the termination of the loop of the inverse element arithmetic process.

Exemplary embodiments of an inverse element arithmetic apparatus will be explained below in detail with reference to the accompanying drawings. The present invention is not limited to the following embodiments.

First Embodiment

An inverse element arithmetic apparatus according to a first embodiment is an apparatus that calculates an inverse element on a finite field, and can be used for digital signature of firmware in a memory system such as a Solid State Drive (SSD). Digital signature uses three algorithms: a key generation algorithm; a signature generation algorithm; and a signature verification algorithm. The key generation algorithm generates a pair of public key and private key. The signature generation algorithm receives firmware and a private key, performs signature generation processing including an inverse element arithmetic operation, and generates a signature. The signature verification algorithm receives the firmware, the public key, and the signature, and performs signature verification process including the inverse element arithmetic operation, and verifies the signature.

For example, a memory system 300 to which a controller 100 including an inverse element arithmetic apparatus 1 is applied has a configuration as illustrated in FIG. 1. FIG. 1 is a diagram illustrating the configuration of the memory system 300 to which the controller 100 including the inverse element arithmetic apparatus 1 is applied. The memory system 300 includes the controller 100 and semiconductor memory 200. The controller 100 includes a main control circuit 101, a signature grant circuit 102, a signature verification circuit 103, and buffer memory 104. The signature verification circuit 103 includes the inverse element arithmetic apparatus 1. The inverse element arithmetic apparatus 1 may be configured as an inverse element arithmetic circuit. The semiconductor memory 200 is non-volatile semiconductor memory (for example, NAND flash memory), and has a storage area 201 and a management information storage area 202. User data may be stored in the storage area 201. The management information storage area 202 stores firmware (FW) 501 and a signature 502. The signature 502 is a digital signature. The signature 502 may be generated by the signature grant circuit 102 or may be generated outside the memory system 300.

When starting the firmware 501 in the memory system 300, the controller 100 temporarily stores the firmware 501 and the signature 502 in the buffer memory 104, and performs the signature verification process on the firmware 501 by the signature verification circuit 103. In the signature verification process, a hash value of the firmware 501 is obtained, the value based on the public key is extracted from the signature 502, and whether a predetermined condition is satisfied is judged by using the hash value of the firmware 501 and the extracted value.

For example, the signature verification circuit 103 may perform signature verification process based on the Elliptic Curve Digital Signature Algorithm (ECDSA) method. The signature 502 has a first part and a second part. The signature verification circuit 103 obtains a hash value of the firmware 501. The signature verification circuit 103 obtains an inverse element of the first part of the signature 502 by the inverse element arithmetic apparatus 1. The signature verification circuit 103 uses the hash value and the inverse element of the first part of the signature 502 to obtain a predetermined parameter. The signature verification circuit 103 obtains coordinate values of a point on an elliptic curve by using a public key, the inverse element of the first part, the second part, and a predetermined parameter. The signature verification circuit 103 judges, as a predetermined condition, whether the condition that there is a match between the second part of the signature 502 and the coordinate values of the points on the elliptic curve is satisfied.

When the predetermined condition is satisfied, the signature verification circuit 103 outputs a result indicating approval, judging that there is no unauthorized tampering. In response to this, the controller 100 will start the firmware 501 and expand functional modules of the firmware 501 into the buffer memory 104, for example. When the predetermined condition is not satisfied, the signature verification circuit 103 outputs a result indicating refusal, judging that there is a possibility of unauthorized tampering. In response to this, the controller 100 will not start the firmware 501. As a result, the memory system 300 can detect and prevent unauthorized tampering with the firmware 501 at startup.

In the memory system 300, in order to speed up the startup of the firmware 501, it is desirable to speed up the signature verification process performed at the startup. In order to speed up the signature verification process, it is desirable to speed up the inverse element arithmetic operation in the signature verification process. When verifying the digital signature based on a method such as ECDSA, the signature verification circuit 103 calculates the inverse element on the finite field by the inverse element arithmetic apparatus 1. The inverse element arithmetic operation needs to be iterated with multiple precisions, and thus significantly increases the operation cost. Here, the word unit processing unit includes a shift operator, and the multiple precision arithmetic unit includes a multiplier. The shift operator and the multiplier have similar bit lengths, and the bit length is set to be one word length (for example, 64 bits). In this case, the multiple precision means the precision corresponding to the total bit length of a plurality of words used in arithmetic operation using the multiplier a plurality of times.

Methods for calculating the inverse element may include a first method based on the extended binary GCD method. The first method is an algorithm that includes iterations of magnitude comparison, LSB even/odd determination, shift operation, and subtraction, using two relatively prime integers as input variables. In the first method, the processing time is increased together with an increase in the bit length of the multiple-precision integer regarding magnitude comparison, shift operation, and subtraction, leading to high arithmetic cost. In order to speed up the arithmetic operation of the inverse element, it is necessary to reduce the calculation cost by performing calculation in consideration of reduction of the number of times of the multiple precision arithmetic operations as much as possible.

In contrast, there is a conceivable method, that is, a second method based on the improved binary GCD method. Being an improvement over the extended binary GCD method, the improved binary GCD method is a method of performing approximate calculation of the extended binary GCD method using high-order words of multiple-precision integers. Based on the improved binary GCD method, the second method performs approximate calculation of the extended binary GCD method by using a one-word length integer instead of the multiple-precision integer. This is considered to be able to reduce the number of times of multiple precision arithmetic operations, leading to achievement of high-speed operation of the inverse element.

Unfortunately, however, the second method has a possibility of increasing the approximation error. For example, in the approximate calculation, the second method sets the high-order word as the approximate variable for the input variables indicating two multiple-precision integers that are relatively prime. The second method performs iterations of magnitude comparison, LSB even/odd determination, shift operation, and subtraction, for the approximate variable. The second method might have an error in the determination of magnitude comparison (that is, the result of the magnitude comparison of the approximate variable and the result of the magnitude comparison of the input variable might be different). In the second method, even when there is an error in determination of the magnitude comparison, iteration of the magnitude comparison, the LSB even/odd determination, the shift operation, and the subtraction would continue for the approximate variable, leading to a possible continuous increase in the approximation error.

In the second method, the end condition is that the value of one of the two input variables becomes 0. Accordingly, an increase in the approximation error might significantly increase the number of times of iterations of the processing. Therefore, in the second method, it is difficult to guarantee the number of times of iterations of the worst case, making it difficult to configure the arithmetic operation to be performed in a constant time. Due to this, when the inverse element arithmetic operation of the second method is applied to the memory system, it would be difficult to guarantee the firmware startup time, and in some cases, the firmware startup time might be prolonged.

In view of these, in the present embodiment, the inverse element arithmetic apparatus 1 generates the number-of-times threshold determined in accordance with the total of the effective bit lengths of two input variables, and iterates through a loop of inverse element arithmetic process in which an approximate variable and the effective bit length are sequentially updated in approximate calculation, and when it is likely to have an error in magnitude determination, update of the effective bit length will be continued while stopping the update of the approximate variable, and then, the loop will be terminated when the loop number of times has reached the number-of-times threshold. This makes it possible to suppress an increase in the approximation error and possible to set a constant number of times of processing in the inverse element arithmetic process.

Specifically, the inverse element arithmetic apparatus 1 receives input of X and Y representing relatively prime integers, and performs, for X and Y, inverse element arithmetic process of finding U and V satisfying:

$$UX+VY=1 \qquad \text{Formula 1,}$$

and outputs the following as an inverse element on a quotient ring Z/XZ:

$$V=Y^{-1} \bmod X \qquad \text{Formula 2.}$$

Although not illustrated, the inverse element arithmetic apparatus 1 includes one or more comparators, one or more shift operators, and one or more subtractors as a hardware configuration. The comparator is used for magnitude comparison of a plurality of variables, or used for even/odd determination of variables (LSB even/odd determination). The shift operator is used to double variables or to divide variables by two. The subtractor is used for subtraction of a plurality of variables or for sign inversion of a variable.

It should be noted that, in the present specification, the one word length means the bit length as a unit of processing of the arithmetic device, and is, for example, 64 bits. Multiple precision means the total bit length of a plurality of words.

Figure 2:
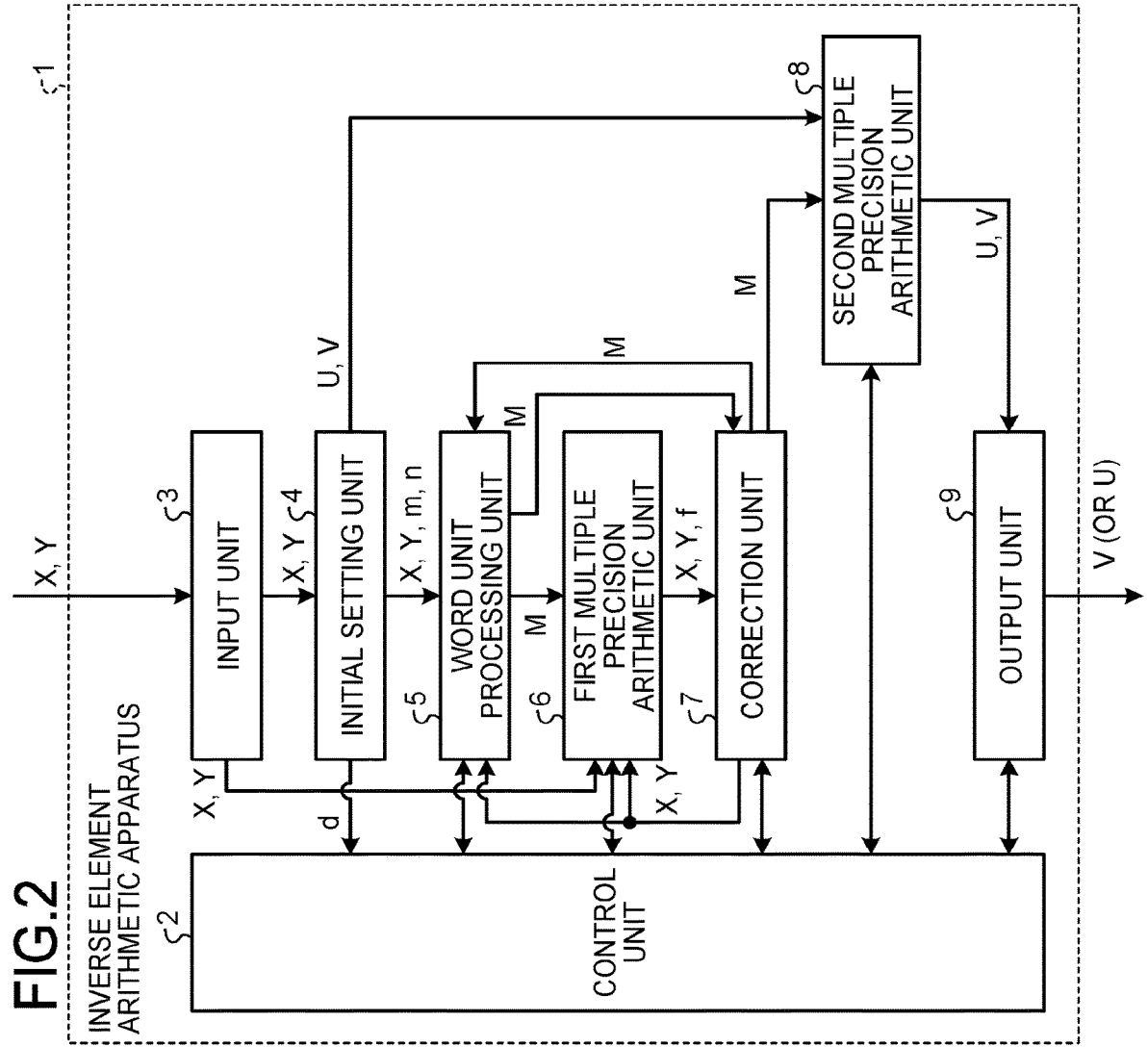
FIG. 2 is a diagram illustrating a configuration of the inverse element arithmetic apparatus according to the first embodiment.

Furthermore, the inverse element arithmetic apparatus 1 may have a functional configuration as illustrated in FIG. 2. FIG. 2 is a diagram illustrating a functional configuration of the inverse element arithmetic apparatus 1. Although the following is an exemplary case where each functional configuration illustrated in FIG. 2 is implemented in hardware form in the inverse element arithmetic apparatus 1, each functional configuration illustrated in FIG. 2 may be implemented in software form. Alternatively, some functional configurations illustrated in FIG. 2 may be implemented in hardware form, and the remaining functional configurations illustrated in FIG. 2 may be implemented in software form.

The inverse element arithmetic apparatus 1 includes a control unit 2, an input unit 3, an initial setting unit 4, a word unit processing unit 5, a first multiple precision arithmetic unit 6, a correction unit 7, a second multiple precision arithmetic unit 8, and an output unit 9. It should be noted that each unit may be implemented as a hardware circuit.

The input unit 3 receives X and Y as input variables from the outside. X and Y are input variables representing relatively prime integers, each of which having a bit pattern indicating an integer. Each of X and Y has a bit length of multiple precisions. X and Y have, for example, a bit length of 256 bits or 384 bits. The input unit 3 supplies X and Y to each of the initial setting unit 4 and the first multiple precision arithmetic unit 6.

The initial setting unit 4 receives input of X and Y from the input unit 3. The initial setting unit 4 sets initial values of U and V for finding U and V satisfying Formula 1 for X and Y. For example, when V is to be obtained as an inverse element on the quotient ring Z/XZ (refer to Formulas 1 and 2), the initial setting unit 4 sets U=0 and V=1 as initial values. The initial setting unit 4 supplies U and V, each having initial values, to the second multiple precision arithmetic unit 8.

The initial setting unit 4 generates m indicating an effective bit length of X, and sets the value of the effective bit length of X as an initial value of m. The initial setting unit 4 may obtain the value of the effective bit length of X by counting the number of consecutive 0s from the MSB in X. The initial setting unit 4 generates n indicating an effective bit length of Y, and sets the value of the effective bit length of Y as an initial value of n. The initial setting unit 4 may obtain the value of the effective bit length of Y by counting the number of consecutive 0 s from the MSB in Y. Note that m and n may have a strict effective bit length or may be an integer of the effective bit length or more. When m and n are integers of the effective bit length or more, the bit length of X may be set as the initial value of m, and the bit length of Y may be set as the initial value of n. The initial setting unit 4 supplies X, Y, m, and n, each having initial values, to the word unit processing unit 5.

The initial setting unit 4 generates a number-of-times threshold d determined in accordance with the sum of m and n, as a parameter that manages the effective bit length of the input variable. For example, the initial setting unit 4 may generate the number-of-times threshold d illustrated by the following Formula 3.

$$d=\lceil (m+n-1)/w \rceil \qquad \text{Formula 3}$$

As illustrated in Formula 3, d is an integer obtained by rounding up the fractional part of (m+n−1)/w. w is a predetermined integer and may be a bit length of one word length. The initial setting unit 4 calculates a quotient by dividing a value obtained by subtracting 1 from the sum of m and n by w, and defines the integer part of this quotient as the number-of-times threshold d. The initial setting unit 4 supplies the number-of-times threshold d to the control unit 2.

The control unit 2 receives input of the number-of-times threshold d from the initial setting unit 4. The control unit 2 controls the word unit processing unit 5, the first multiple precision arithmetic unit 6, the correction unit 7, and the second multiple precision arithmetic unit 8 to iterate through the loop of the inverse element arithmetic process. The loop of the inverse element arithmetic process is a loop in which the word unit processing unit 5, the first multiple precision arithmetic unit 6, the correction unit 7, and the second multiple precision arithmetic unit 8 are sequentially operated under the control of the control unit 2. Furthermore, the control unit 2 manages the loop number of times of the inverse element arithmetic process. The control unit 2 compares the loop number of times of the inverse element arithmetic process with the number-of-times threshold d. When the loop number of times of the inverse element arithmetic process is the number-of-times threshold or less, the control unit 2 iterates through the loop of the inverse element arithmetic process.

The word unit processing unit 5 receives input of X, Y, m, and n, each having initial values, from the initial setting unit 4 in a first-round loop of the inverse element arithmetic process. The word unit processing unit 5 receives input of the updated X and Y from the correction unit 7 in the second-round and subsequent loops of the inverse element arithmetic process. The word unit processing unit 5 iterates through the first loop or the second loop as a loop of approximate calculation of the extended binary GCD process.

Figure 3:
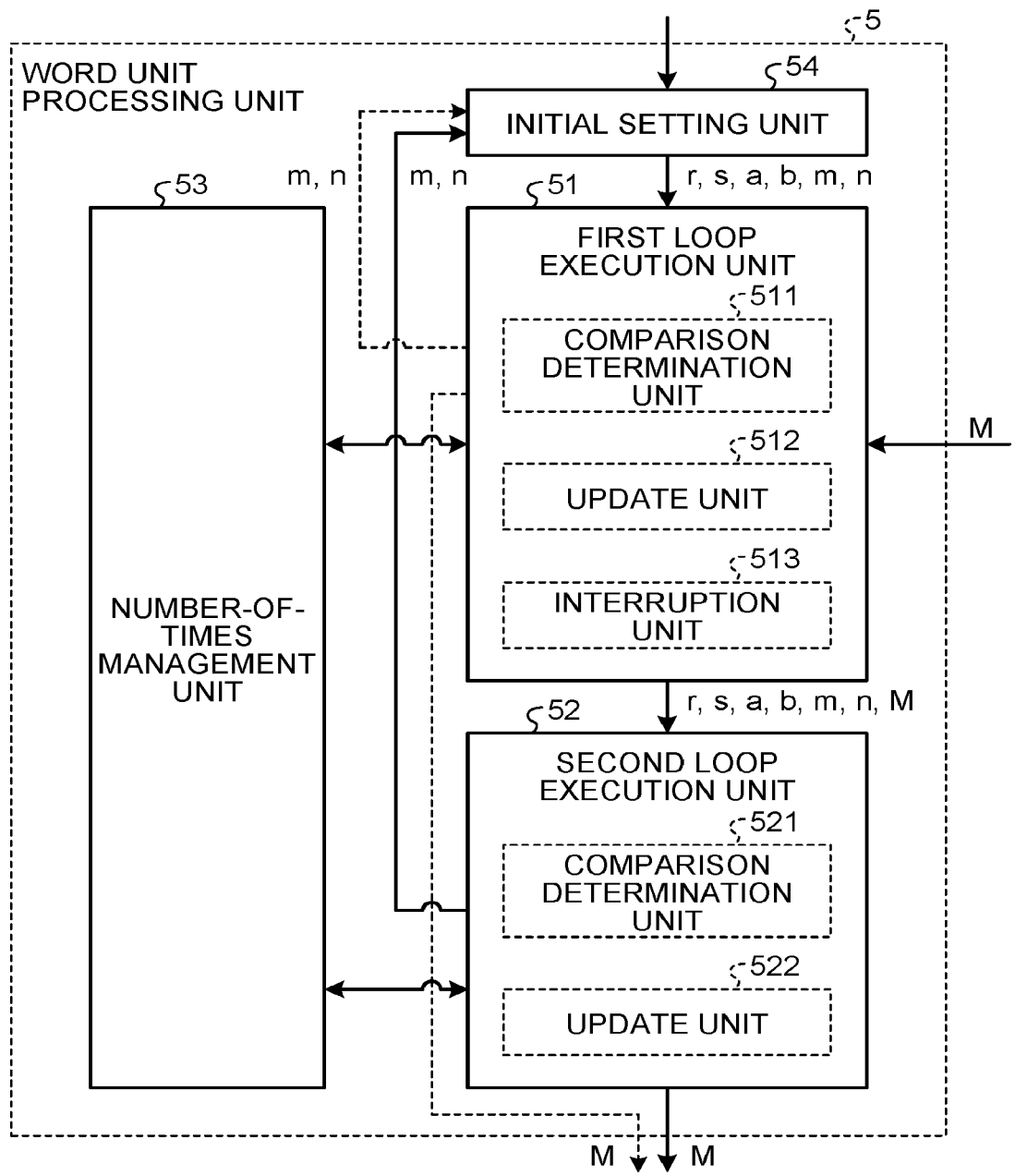
FIG. 3 is a diagram illustrating a configuration of a word unit processing unit in the first embodiment.

For example, the word unit processing unit 5 may have a configuration as illustrated in FIG. 3. FIG. 3 is a diagram illustrating the configuration of the word unit processing unit 5. The word unit processing unit 5 includes an initial setting unit 54, a first loop execution unit 51, a second loop execution unit 52, and a number-of-times management unit 53.

The initial setting unit 54 receives X, Y, m, and n. The initial setting unit 54 specifies a most significant bit position of the effective bits of X and Y in accordance with m and n. Correspondingly, the initial setting unit 54 generates r indicating the high-order w+t bits of X as well as generating a indicating the low-order w bits, as approximate variables of X. Note that t is a predetermined integer which may be:

$$\lceil \log_2(w\pm 2) \rceil$$

For example, w=64 and w+t=71. The initial setting unit 54 sets the value of the high-order w+t bits of X as an initial value of r and sets the value of the low-order w bits as an initial value of a. The initial setting unit 54 generates s indicating the high-order w+t bits of Y as well as generating b indicating the low-order w bits, as approximate variables of Y. The initial setting unit 54 sets the value of the high-order w+t bits of Y as an initial value of s and sets the value of the low-order w bits as an initial value of b.

At this time, when the high-order bits of X and Y are taken as the approximate variables of X and Y, the initial setting unit 54 takes the w+t bits slightly longer than the bit length of one word length and sets the bits as the approximate variables r and s. This makes it possible to suppress the occurrence of an approximation error when the word unit processing unit 5 performs an approximate calculation of the extended binary GCD process using the approximate variables r and s.

The initial setting unit 54 supplies r, s, a, b, m, and n, each having initial values, to the first loop execution unit 51.

The first loop execution unit 51 iterates through the first loop when the value of |r−s| is a subtraction threshold or more. The subtraction threshold is a threshold at which the high-order bits of |r−s| become 0, and is a threshold indicating that the values of r and s are close to each other. The subtraction threshold is $2^t$, for example. In the first loop, the first loop execution unit 51 makes an even/odd determination of a and b or a magnitude determination of r and s, and updates the values r, s, a, b, m, and n, as well as generating or updating the update matrix M, in accordance with the determination result.

The first loop execution unit 51 includes a comparison determination unit 511, an update unit 512, and an interruption unit 513.

The comparison determination unit 511 compares the value of |r−s| with the subtraction threshold, and determines whether the value of |r−s| is a subtraction threshold or more. When the value of |r−s| is the subtraction threshold or more, the comparison determination unit 511 confirms the LSBs of a and b and makes an even/odd determination of a and b. For each of a and b, the comparison determination unit 511 determines that the value a (or b) is an even number when the LSB is 0, and determines that a (or b) is an odd number when the LSB is 1. When both a and b are odd numbers, the comparison determination unit 511 compares the magnitude of r and s so as to make a magnitude determination of r and s. The comparison determination unit 511 notifies the update unit 512 of the determination results. When the value of |r−s| is smaller than the subtraction threshold, the comparison determination unit 511 notifies the interruption unit 513 of the determination result.

When the update unit 512 has received the determination result from the comparison determination unit 511, the update unit 512 performs the following processing depending on the determination result.

When a is an even number, the update unit 512 divides a and r by 2, decrements m, and updates the update matrix M accordingly. That is, the update unit 512 shifts a and r to the right by 1 bit each with the shift operator, and subtracts 1 from m with the subtractor. The update unit 512 determines the update matrix M corresponding to the division of a and r, multiplies the current update matrix M by a newly determined update matrix M with a multiplier (shift operator) so as to update the update matrix M.

When b is an even number, the update unit 512 divides b and s by 2, decrements n or replaces n with 0, and updates the update matrix M accordingly. That is, the update unit 512 shifts b and s to the right by 1 bit each with the shift operator, and subtracts 1 from n with the subtractor. The update unit 512 determines the update matrix M corresponding to the division of b and s, multiplies the current update matrix M by a newly determined update matrix M with a multiplier (shift operator) so as to update the update matrix M.

When a and b are both odd numbers and r>s, the update unit 512 replaces a and r with (a−b)/2 and (r−s)/2, respectively, and decrements m, and then, updates the update matrix M accordingly. That is, the update unit 512 subtracts b from a by the subtractor, shifts the subtraction result by 1 bit to the right with the shift operator, and subtracts 1 from m with the subtractor. The update unit 512 determines the update matrix M corresponding to the replacement of a with (a−b)/2, multiplies the current update matrix M by a newly determined update matrix M with a multiplier (shift operator) so as to update the update matrix M.

When a and b are both odd numbers and r≤s, the update unit 512 replaces b and s with (b−a)/2 and (s−r)/2, respectively, and decrements n, and then updates the update matrix M accordingly. That is, the update unit 512 subtracts a from b with the subtractor, shifts the subtraction result to the right by 1 bit with the shift operator, and subtracts 1 from n with the subtractor. The update unit 512 determines the update matrix M corresponding to the replacement of b with (b−a)/2, multiplies the current update matrix M by a newly determined update matrix M with a multiplier (shift operator) so as to update the update matrix M.

Having received a determination result that the value of |r−s| is smaller than the subtraction threshold, the interruption unit 513 requests the comparison determination unit 511 and the update unit 512 to interrupt the first loop in accordance with the determination result. The comparison determination unit 511 stops operation in response to the request. In response to the request, the update unit 512 supplies the updated values of r, s, a, b, m, and n to the interruption unit 513, and stops the operation. The interruption unit 513 supplies the values of r, s, a, b, m, and n to the second loop execution unit 52.

The second loop execution unit 52 iterates through the second loop instead of the first loop when the value of |r−s| is smaller than the subtraction threshold. In the second loop, the second loop execution unit 52 updates the values of m and n without updating the values of r, s, a, and b, and with practically no update of the update matrix M.

That is, when the value of |r−s| is smaller than the subtraction threshold, the word unit processing unit 5 determines that there is a possibility of occurrence of errors in magnitude determination of r and s because these values of r and s are close to each other, and therefore updates the values of m and n while stopping the update of r, s, a, and b and stopping the update of the update matrix M. This makes it possible to suppress updating r, s, a, and b based on erroneous determination results, leading to suppression of an increase in the approximation error.

The second loop execution unit 52 includes a comparison determination unit 521 and an update unit 522.

The comparison determination unit 521 compares the value of n with a predetermined threshold. The predetermined threshold is a value obtained by subtracting w from the larger value of m and n. The comparison determination unit 521 determines whether the value of n is larger than the predetermined threshold, and notifies the update unit 522 of the determination result.

When the value of n is larger than a predetermined threshold, the update unit 522 decrements n and will not update the update matrix M. That is, the update unit 522 subtracts 1 from n with the subtractor. The update unit 512 sets the update matrix M to an identity matrix based on the determination that the values of r, s, a, and b are not to be updated. The update unit 512 then multiplies the current update matrix M by the identity matrix with a multiplier (shift operator) so as to update the update matrix M on the surface, but does not update the update matrix M practically.

When the value of n is a predetermined threshold or less, the update unit 522 decrements m and does not update the update matrix M. That is, the update unit 522 subtracts 1 from m with the subtractor. The update unit 512 sets the update matrix M to an identity matrix based on the determination that the values of r, s, a, and b are not to be updated. The update unit 512 then multiplies the current update matrix M by the identity matrix with a multiplier (shift operator) so as to update the update matrix M on the surface, but does not update the update matrix M practically.

The number-of-times management unit 53 manages the total loop number of times of the first loop and the second loop. When the total loop number of times has reached w, the number of times management unit 53 terminates the loop of the extended binary GCD process.

Each time the values of r, s, a, b, m, and n are updated, the update unit 512 of the first loop execution unit 51 notifies the number-of-times management unit 53 that the update has been performed. Each time the values of m, and n are updated, the update unit 522 of the second loop execution unit 52 notifies the number-of-times management unit 53 that the update has been performed. The number-of-times management unit 53 holds a parameter for managing the loop number of times, and counts up the value of the parameter each time a notification is received from the update unit 512 or the update unit 522.

Having determined that the loop number of times has reached w times based on the value of the parameter, the number-of-times management unit 53 performs the following operation.

When the update unit 512 has stopped operation and the update unit 522 is in operation, the number-of-times management unit 53 requests the update unit 522 to terminate the second loop. In response to the request, the update unit 512 supplies the update matrix M to the first multiple precision arithmetic unit 6 and the correction unit 7, and supplies m and n to the initial setting unit 54, as indicated by the solid arrow, and then, stops operation.

When the update unit 512 is in operation, the number-of-times management unit 53 requests the update unit 512 to terminate the first loop. In response to the request, the update unit 512 supplies the update matrix M to the first multiple precision arithmetic unit 6 and the correction unit 7, and supplies m and n to the initial setting unit 54, as indicated by the dotted arrow, and then, stops operation.

With this operation, in each of loops of the inverse element arithmetic process, the extended binary GCD process is performed for the loop number of times of w times corresponding to one word length, decreasing the sum of m and n by w.

The first multiple precision arithmetic unit 6 illustrated in FIG. 2 receives input of X and Y from the input unit 3 in the first-round loop of the inverse element arithmetic process. In the second-round and subsequent loops of the inverse element arithmetic process, X and Y are input from the correction unit 7. The update matrix M is input from the word unit processing unit 5 to the first multiple precision arithmetic unit 6. The first multiple precision arithmetic unit 6 updates the values of X and Y based on the update matrix M. That is, the first multiple precision arithmetic unit 6 multiplies the update matrix M and the vector including X and Y with a multiplier, and sets the multiplication result as values of the updated X and Y. The first multiple precision arithmetic unit 6 generates or updates f based on positive/negative of the updated X and Y. f is a variable that indicates positive/negative of X and Y. Specifically, when f is a value of 0, X (or Y) indicates positive, and when f is a value of 1, X (or Y) indicates negative. For example, when generating f, the first multiple precision arithmetic unit 6 sets f to 0 as an initial value. The first multiple precision arithmetic unit 6 confirms positive/negative of the value of Y with a comparator. The first multiple precision arithmetic unit 6 maintains or updates f such that f=0 when the value of Y is positive, and updates f such that f=1 when the value of Y is negative. The first multiple precision arithmetic unit 6 supplies the updated X, Y, and f to the correction unit 7.

The correction unit 7 receives input of the updated X, Y, and f from the first multiple precision arithmetic unit 6, and receives input of the update matrix M from the word unit processing unit 5. Based on f, the correction unit 7 updates X, Y, and M so that the values of X and Y are non-negative. For example, when X is maintained at a positive value, the correction unit 7 will not update X. When the value of f is 0, the correction unit 7 assumes that Y is positive and will not update Y or the update matrix M. When the value of f is not 0 (that is, when the value of f is 1), the correction unit 7 assumes that Y is negative, inverts the sign of Y, and determines an update matrix M that inverts the sign of Y. The correction unit 7 multiplies the update matrix M by the current update matrix M with a multiplier and updates the update matrix M. The correction unit 7 supplies the updated update matrix M to the second multiple precision arithmetic unit 8.

The second multiple precision arithmetic unit 8 receives input of U and V, each having initial values, from the input unit 3 in the first-round loop of the inverse element arithmetic process. The second multiple precision arithmetic unit 8 receives input of the update matrix M from the correction unit 7. When the update matrix M has been input, the second multiple precision arithmetic unit 8 updates the values of U and V based on the update matrix M. That is, the first multiple precision arithmetic unit 6 multiplies the update matrix M and the vector including U and V with a multiplier, and sets the multiplication result as values of the updated U and V.

When the U and V have been updated by the second multiple precision arithmetic unit 8, the control unit 2 increments the loop number of times of the inverse element arithmetic process and compares the loop number of times of the inverse element arithmetic process with the number-of-times threshold d. When the loop number of times of the inverse element arithmetic process is the number-of-times threshold d or less, the control unit 2 controls to execute the loop of the inverse element arithmetic process again. When the loop number of times of the inverse element arithmetic process is greater than the number-of-times threshold d, the control unit 2 terminates the loop of the inverse element arithmetic process assuming that the sum of m and n is 1 or less. That is, the control unit 2 instructs each of the word unit processing unit 5, the first multiple precision arithmetic unit 6, the correction unit 7, and the second multiple precision arithmetic unit 8 to stop operation.

In response to this, the word unit processing unit 5, the first multiple precision arithmetic unit 6, and the correction unit 7 individually stop their operations. The second multiple precision arithmetic unit 8 supplies the updated U and V to the output unit 9 and stops operation.

The output unit 9 receives the updated U and V from the second multiple precision arithmetic unit 8. Having received the updated U and V, the output unit 9 judges that the loop of the inverse element arithmetic process has been terminated. In response to the termination of the loop of the inverse element arithmetic process, the output unit 9 outputs $V = Y^{-1} \mod X$ as an inverse element on a quotient ring Z/XZ. That is, when the sum of m and n is 1 or less, one of X and Y can be considered to be approximately 0 (X=0 in this case), and the updated U and V approximately satisfy Formula 1. That is, Formula 1 can be transformed as:

$$VY \equiv 1 \mod X \qquad \text{Formula 4,}$$

in which VY is congruent to 1 with X as the modulo. This leads to establishment of Formula 2, which means that V is obtained as the inverse element on the quotient ring Z/XZ. The output unit 9 outputs V to the outside (for example, to the signature verification circuit 103).

Next, operations of the inverse element arithmetic apparatus 1 will be described with reference to FIGS. 4A and 4B. FIGS. 4A and 4B are pseudocodes illustrating operations of the inverse element arithmetic apparatus 1. In the pseudocodes of FIGS. 4A and 4B, the description of FIG. 4A continues to the description of FIG. 4B.

The pseudocodes of FIGS. 4A and 4B illustrate a procedure for performing an inverse element arithmetic process of finding U and V satisfying Formula 1 for X and Y representing relatively prime integers. Initial setting for the inverse element arithmetic process is performed in Description 11, a loop (loop_j) of the inverse element arithmetic process is executed in Description 12, and an inverse element V obtained by loop_j is output in Description 13.

In Description 12, initial setting is performed in Description 121, an approximate calculation loop (loop_i) of the extended binary GCD process is executed in Description 122, X and Y are updated in Description 123, X and Y are corrected in Description 124, and U and V are updated in Description 125.

In Description 122, the first loop (case_1) is executed in Description 1221 while e=0. When |r−s| is smaller than the subtraction threshold and it is determined that the magnitude comparison of r and s might be different from the magnitude comparison of X and Y, that value e is changed such that e=1, and the second loop (case_2) will be executed.

Specifically, in Description 11, initial setting for the inverse element arithmetic process is performed. Settings are performed with U=0 and V=1 as initial values. Generation of m, which indicates the effective bit length of X, and generation of n, which indicates the effective bit length of Y, are performed. Generation of w, which indicates the one word length, and generation of t, which indicates the number of additional bits corresponding to the one word length, are performed. An example of the number of additional bits is:

$$\lceil \log_2(w \pm 2) \rceil$$

The number-of-times threshold, determined in accordance with the sum of m and n, may be generated as:

$$d = \lceil (m+n-1)/w \rceil$$

In Description 12, the loop (loop_j) of the inverse element arithmetic process is executed. The loop of the inverse element arithmetic process is described by a "for" statement, in which j is incremented from the initial value 0 every time the loop is executed, and the loop is terminated when j exceeds d.

That is, the loop of the inverse element arithmetic process is terminated when the loop is iterated d times, with the end condition set to the number-of-times threshold d. This makes it possible to achieve processing with a constant number of times.

In Description 121, initial settings are performed for the approximate calculation of the extended binary GCD process. The current values of m and n are defined as $m_0$ and $n_0$, and the larger of $m_0$ and $n_0$ is defined as k. k indicates the most significant bit position of the effective bits of X and Y. $k-(w+t)$ is set as h. When $a_0 = X[w-1:0]$, the low-order w bits of X are set to $a_0$, and when $b_0 = Y[w-1:0]$, the low-order w bits of Y are set to $b_0$. When $r_0 = X[k-1:h]$, the high-order (w+t) bits in the significant bit of X are set to $r_0$, and when $s_0 = Y[k-1:h]$, the high-order (w+t) bits in the significant bit of Y are set to $s_0$. The update matrix M is set to an identity matrix as the initial value. In parameter e indicating whether there is a possibility of erroneous determination of the magnitude relationship, 0 is set as an initial value.

In Description 122, a loop (loop_i) of approximate calculation of extended binary GCD process is executed. The loop of the approximate calculation is described by a "for" statement, in which i is incremented from the initial value 0 every time the loop is executed, and the loop is terminated when i exceeds w.

That is, the loop of the approximate calculation is terminated when the loop is iterated w times with the end condition set to a number-of-times threshold w. This makes it possible to achieve processing with a constant number of times.

In Description 1221, the processing of the first loop (case_1) is performed. case_1 is described as a conditional part of e=0 in the "if" statement and is executed while e=0. When all of conditions "k>w+t", "$a_i$ and $b_i$ are both odd numbers", and "$|r_i-s_i|$ is smaller than the subtraction threshold $2^t$" are satisfied, the value of e (that is, $e_i$) is set to 1 due to the possibility of occurrence of erroneous magnitude determination of r and s. Otherwise, the value of e is maintained at 0.

In a case where a is an even number, processing of case_A is performed. a and r are divided by 2, m is decremented, and the update matrix M is determined accordingly. In case_A, although a and b, r and s, and m and n are exchanged at the time of update, b, s, and n have not been updated practically.

In a case where b is an even number, processing of case_B is performed. b and s are divided by 2, n is replaced by the decremented value and 0, whichever is greater, and the update matrix M is determined accordingly.

When both a and b are odd numbers and r>s, the processing of case_C will be performed. a and r are respectively replaced by (a−b)/2 and (r−s)/2, m is decremented, and the update matrix M is determined accordingly. In case_C, although a and b, r and s, and m and n are exchanged at the time of update, b, s, and n have not been updated practically.

When both a and b are odd numbers and r≤s, the processing of case_D is performed. b and s are respectively replaced with (b−a)/2 and (s−r)/2, n is decremented, and the update matrix M is determined accordingly.

In Description 1222, the processing of the second loop (case_2) is performed. case_2 is described as a conditional part of e≠0 in the "if" statement, and is executed when e≠0. In case_2, the values of r, s, a, and b are not updated. Correspondingly, the update matrix M is determined as an identity matrix. The value of n is compared to a predetermined threshold. When the value of n is greater than the predetermined threshold, n is decremented. When the value of n is the predetermined threshold or less, m is decremented.

In Description 1223, the current update matrix M is multiplied by the newly determined update matrix M so as to update the update matrix M. Moreover, the current values of m and n ($m_{i+1}$ and $n_{i+1}$) are set as m and n.

In Description 123, update of X and Y, and generation or update of f are performed. The updated update matrix M is multiplied by a vector containing the current X and Y as elements, thereby generating a vector containing the updated X and Y as elements. In addition, a variable f indicating positive/negative of Y is generated with 0 as an initial value. The positive/negative of updated Y is confirmed. When Y is negative, the value of f will be updated to 1.

Description 124 is execution of correction process to turn negative Y to positive Y. This processing is described as a conditional part of f≠0 in the "if" statement, in which f≠0 (that is, when f=1) indicates negative Y and then, the correction process is performed correspondingly. In the correction process, Y is updated with sign inversion, and the update matrix M is updated accordingly.

Description 125 includes update of U and V. The updated update matrix M is multiplied by a vector containing the current U and V as elements, thereby generating a vector containing the updated U and V as elements.

In the processing of FIGS. 4A and 4B, the first loop (case_1) is executed while e=0. The determination processing of case_A to case_D in case_1 is similar to the second method based on the improved binary GCD method. However, this processing has differences in that management of the effective bit lengths m and n are performed, and that, when it is determined that the magnitude comparison of r and s might be different from the magnitude comparison of X and Y, the value e is changed such that e=1 and the second loop (case_2) will be executed. In case_2, the values of m and n are updated, and the values of r, s, a and b are not updated. That is, even when the value of the approximate variables s and b of Y might be temporarily erroneous in the determination of the magnitude relationship in iteration of loop_i, subsequent X and Y values would not be updated based on the erroneous values. Furthermore, these erroneous values can be easily corrected later because these include merely sign inversion with respect to correct values.

In the processing of FIGS. 4A and 4B, the magnitude comparison is performed using the approximate variable of the high-order one word (w bits)+t bits of the multiple precision integer (input variable), in which t is a constant that depends on w. For example, by setting t to an integer obtained by rounding up the fractional part of $\log_2(w+2)$, it is possible to complete the processing without causing an approximation error, which can be proved (refer to Proof 1 to Proof 4 described below).

In the processing of FIGS. 4A and 4B, the number of times of iterations of the loop of the inverse element arithmetic process is determined from the bit length of the input variable, and does not depend on the value of the input variable. This makes it possible to implement processing with a constant number of times, and possible to guarantee the worst case.

Next, operations of the inverse element arithmetic apparatus 1 will be described with reference to FIG. 5. FIG. 5 is a flowchart illustrating operations of the inverse element arithmetic apparatus 1.

In the inverse element arithmetic apparatus 1, when X and Y representing relatively prime integers have been input from the input unit 3, the initial setting unit 4 performs initialization processing corresponding to Description 11 (refer to FIG. 4A) (S1). The initial setting unit 4 sets the initial values of U and V and supplies the set values to the second multiple precision arithmetic unit 8. The initial setting unit 4 generates m and n indicating the effective bit lengths of X and Y and supplies the generated m and n to the word unit processing unit 5. The initial setting unit 4 generates a number-of-times threshold d determined in accordance with the sum of m and n and supplies the generated d to the control unit 2.

The control unit 2 iterates through the loop (S10) of the inverse element arithmetic process corresponding to Description 12 until the loop number of times reaches d.

In the loop (S10) of the inverse element arithmetic process, the control unit 2 compares the loop number of times of the inverse element arithmetic process with the number-of-times threshold d. The control unit 2 performs S11 to S14 when the loop number of times is the number-of-times threshold d or less. The control unit 2 controls the word unit processing unit 5 to perform word unit processing corresponding to Descriptions 121 and 122 (S11).

Figure 6:
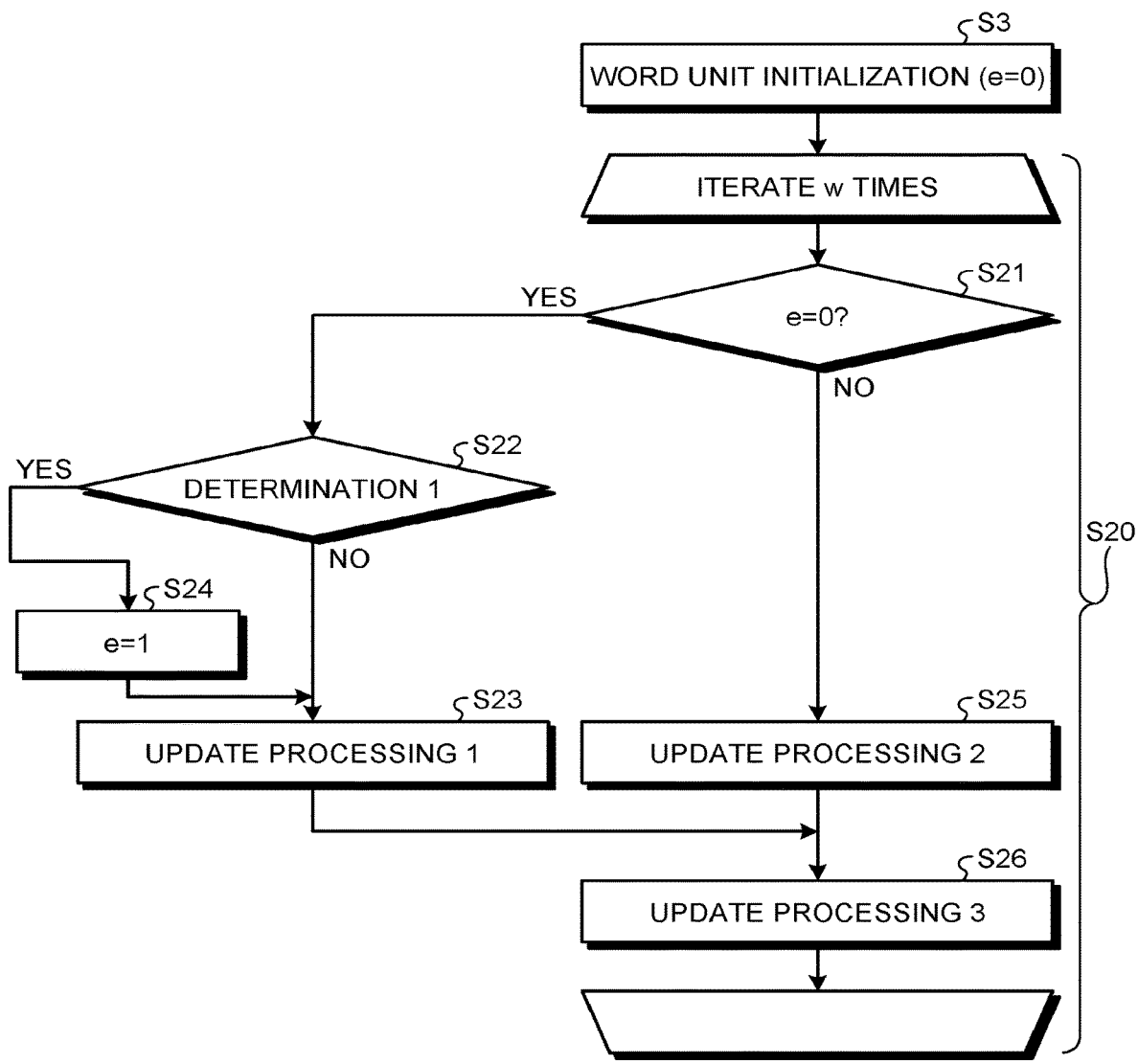
FIG. 6 is a flowchart illustrating word unit processing in the first embodiment.

In the word unit processing (S11), the word unit processing unit 5 performs the processing as illustrated in FIG. 6. FIG. 6 is a flowchart illustrating word unit processing (S11).

The word unit processing unit 5 performs word unit initialization corresponding to Description 121 (S3). The word unit processing unit 5 generates r and s indicating the high-order w+t bits of X and Y, and generates a and b indicating the low-order w bits of X and Y. The word unit processing unit 5 iterates through the approximate calculation loop (S20) of the extended binary GCD process until the loop number of times reaches w.

In the approximate calculation loop (S20) of the extended binary GCD process, the word unit processing unit 5 compares the loop number of times of the approximate calculation with the number-of-times threshold w. When the loop number of times is the number-of-times threshold w or less, the control unit 2 performs S21 to S26. The word unit processing unit 5 confirms the parameter e indicating whether there is a possibility of erroneous determination of the magnitude relationship. When e=0 (Yes in S21), the word unit processing unit 5 performs Determination 1 regarding whether there a possibility of erroneous determination of the magnitude relationship (S22). When all of conditions "k>w+t", "$a_i$ and $b_i$ are both odd numbers", and "$|r_i-s_i|$ is smaller than the subtraction threshold 2'" are satisfied in Determination 1, it is determined that there is a possibility of erroneous determination of magnitude relationship. When any of these conditions is not satisfied, it is determined that there is no possibility of erroneous determination of magnitude relationship. When it is determined that there is no possibility of erroneous determination of the magnitude relationship (No in S22), the word unit processing unit 5 performs Update processing 1 for the first loop (S23) corresponding to Description 1221. When it is determined that there is a possibility of erroneous determination of the magnitude relationship (Yes in S22), the word unit processing unit 5 sets e=1 (S24) and performs Update processing 1 for the first loop (S23) corresponding to Description 1221.

In contrast, when e≠0 (No in S21), the word unit processing unit 5 determines that there is a possibility of erroneous determination of the magnitude relationship, and performs Update processing 2 for the first loop (S25) corresponding to Description 1222.

After S23 or S25, the word unit processing unit 5 performs Update processing 3 (S26) corresponding to Description 1223. When the loop number of times exceeds the number-of-times threshold w, the word unit processing unit 5 exits the loop (S20).

Returning to FIG. 5, the control unit 2 controls the first multiple precision arithmetic unit 6 to perform the first multiple precision arithmetic operation corresponding to Description 123 (S12). The control unit 2 controls the correction unit 7 to perform the correction process corresponding to Description 124 (S13). The control unit 2 controls the second multiple precision arithmetic unit 8 to perform the second multiple precision arithmetic operation corresponding to Description 124 (S14). When the loop number of times exceeds the number-of-times threshold d, the control unit 2 exits the loop (S10) and notifies the output unit 9 of the end of S10.

In response to the termination of S10, the output unit 9 performs output processing corresponding to Description 13 (S2). The output unit 9 outputs $V=Y^{-1}$ mod X as an inverse element on the quotient ring Z/XZ.

As described above, in the first embodiment, the inverse element arithmetic apparatus 1 generates a number-of-times threshold determined in accordance with the sum of the effective bit lengths of two input variables. The inverse element arithmetic apparatus 1 iterates through a loop of inverse element arithmetic process in which an approximate variable and the effective bit length are sequentially updated in approximate calculation, and when it is likely to have an error in magnitude determination, the update of the effective bit length will be continued while stopping the update of the approximate variable. This makes it possible to suppress an increase in the approximation error in approximate calculation. The inverse element arithmetic apparatus 1 terminates the processing loop when the loop number of times of the inverse element arithmetic process reaches the number-of-times threshold. This makes it possible to achieve a constant number of times of processing in the inverse element arithmetic process while suppressing an increase in the approximation errors. As a result, the multiple precision inverse element arithmetic operation on the finite field may be performed at high speed and in a constant time, making it possible to guarantee the worst case for the number of times of iterations of the inverse element arithmetic process. Therefore, when the inverse element arithmetic apparatus 1 is applied to the signature verification of the firmware in the memory system 300, the startup time of the firmware may be guaranteed.

Note that the inverse element arithmetic apparatus 1 may perform inverse element arithmetic process of finding U and V satisfying Formula 1 for X and Y representing relatively prime integers, and may output $$U=X^{-1} \bmod Y \qquad \text{Formula 5}$$

as an inverse element on the quotient ring Z/YZ. In this case, the initial setting unit 4 sets U=1 and V=0 as initial values and supplies the values to the second multiple precision arithmetic unit 8. Furthermore, in response to the termination of the loop of the inverse element arithmetic process, the output unit 9 outputs U illustrated in Formula 5 as an inverse element on the quotient ring Z/YZ. That is, when the sum of m and n is 1 or less, it can be considered that one of X and Y is approximately 0 (Y=0 in this case), and the updated U and V approximately satisfy Formula 1. That is, Formula 1 may be transformed into:

$$UX \equiv 1 \bmod Y \qquad \text{Formula 6}$$

Since UX is congruent to 1 with Y as the modulo, Formula 5 holds, and U is obtained as the inverse element of X on the quotient ring Z/YZ. The output unit 9 outputs U to the outside (for example, to the signature verification circuit 103).

Furthermore, in a case where X is an odd number, because there is no possibility where the condition of case_A is satisfied, the inverse element arithmetic apparatus 1 may be implemented in a hardware form with the condition branch of case_A removed from the pseudocode of FIGS. 4A, 4B. With this configuration, the inverse element arithmetic apparatus 1 reduces circuit scale to be implemented in a hardware form.

Furthermore, the inverse element arithmetic process by the inverse element arithmetic apparatus 1 may be used for granting a signature of system information in the memory system 300. The system information may be, for example, a vendor name, a model name, a serial number, a firmware version, a hash value, an arbitrary value held in the semiconductor memory 200, or the like. In this case, the signature grant circuit 102 illustrated in FIG. 1 may include the inverse element arithmetic apparatus 1. When the controller 100 has received, in the memory system 300, the firmware 501 to be stored in the semiconductor memory 200, the controller 100 temporarily stores the firmware 501 in the buffer memory 104, and controls the signature grant circuit 102 to perform the signature grant processing for the firmware 501. In the signature verification process, the hash value of the firmware 501 is obtained, the signature 502 is generated from the hash value of the firmware 501 based on a private key, and the signature 502 is granted to the firmware 501.

For example, the signature grant circuit 102 may perform the signature grant processing according to the Elliptic Curve Digital Signature Algorithm (ECDSA) method. The signature 502 has a first part and a second part. The signature grant circuit 102 obtains the hash value of the firmware 501. The signature grant circuit 102 selects a predetermined integer and obtains coordinate values of a point on an elliptic curve corresponding to a predetermined integer. The signature grant circuit 102 generates the second part of the signature 502 using the coordinate values of the point on the elliptic curve. The signature grant circuit 102 obtains the inverse element of the predetermined integer by the inverse element arithmetic apparatus 1. The signature grant circuit 102 generates the first part of the signature 502 by using the inverse element of the predetermined integer, the value corresponding to the hash value of the firmware 501, the second part of the signature 502, and the private key. After generating the signature 502 having the first part and the second part, the signature grant circuit 102 stores the signature 502 in the semiconductor memory 200 together with the firmware 501.

In a use case where the inverse element arithmetic apparatus 1 is used for the signature grant processing in the memory system 300, it is desirable, from the viewpoint of security, to perform arithmetic operations in a constant time regardless of the value of data. For example, the memory system 300 may be subject to a side-channel attack that attempts unauthorized overwrite over the firmware 501 by deriving a private key by utilizing the data dependency of the processing time of the inverse element arithmetic process. Against this, according to the inverse element arithmetic apparatus 1, it is possible, regarding the inverse element arithmetic process, to perform processing with a constant number of times while suppressing an increase in the approximation errors. As a result, it is possible to perform the multiple precision inverse element arithmetic operations on the finite field at high speed and in a constant time, enhancing the side-channel attack resistance.

Furthermore, the inverse element arithmetic process by the inverse element arithmetic apparatus 1 may also be used for encryption processing and decryption processing by the ECDSA method or the like, or may be used for other processing including the inverse element arithmetic process.

Second Embodiment

Next, the inverse element arithmetic apparatus 1 according to a second embodiment will be described. In the following, portions different from the first embodiment will be mainly described.

In the first embodiment, in the first loop (loop_i) of the approximate calculation, the magnitude determination of X and Y is approximated by the magnitude determination of r and s. In contrast, in the second embodiment, the magnitude determination of X and Y is approximated by the magnitude determination of m and n. Since X and Y are given as binary, the magnitude relationship is likely to be reflected in the magnitude of the effective number of bits. Accordingly, it is possible to approximate the magnitude determination of X and Y by the magnitude determination of m and n.

At this time, since a bit number of m and n (for example, 7 bits) is smaller than a bit number of r and s (for example, 70 bits), it is possible to reduce the load on magnitude determination processing by approximating the magnitude determination of X and Y by the magnitude determination of m and n. This can reduce the critical path delay, making it possible to reduce the overall critical path delay and thus reduce the number of comparators compared to the case of performing magnitude determination of r and s, leading to achievement of reduction of the circuit scale. That is, it is possible to reduce the circuit scale in a case where the inverse element arithmetic apparatus 1 is implemented by hardware.

Specifically, in the inverse element arithmetic apparatus 1, when both a and b are odd numbers in the first loop, the word unit processing unit 5 updates r, s, a, b, m, and n based on the magnitude relationship of m and n without using the magnitude relationship of r and s. When this operation is described with pseudocode, a description portion 1221*cd* illustrated in FIG. 7A of the first embodiment is changed to a description portion 1221*cf* illustrated in FIG. 7B in the second embodiment. FIG. 7A is a diagram illustrating a part of the pseudocodes of the first embodiment illustrated in FIG. 4. FIG. 7B is a diagram illustrating the pseudocode of the second embodiment, a modified portion from the pseudocode of the first embodiment.

In the description portion 1221*cf*, the update content of the approximate variables r and a is switched based on the result of the magnitude comparison of m and n, instead of the magnitude comparison of r and s. case_C' and case E of the description portion 1221*cf* correspond to case_C of the description portion 1221*cd*, while case_D' and case F of the description portion 1221*cf* correspond to case_D of the description portion 1221*cd*.

When both a and b are odd numbers and m>n, the processing of case_C' is performed to determine the second row ($\mu_2$ and $\mu_3$) of the update matrix M, and then, the processing of case E is performed to determine the first row ($\mu_0$ and $\mu_1$) of the update matrix M. Thereafter, the first row and the second row are integrated to determine the update matrix M.

When both a and b are odd numbers and m≤n, the processing of case_D' is performed to determine the second row ($\mu_2$ and $\mu_3$) of the update matrix M, and then, the processing of case F is performed to determine the first row ($\mu_0$ and $\mu_1$) of the update matrix M. Thereafter, the first row and the second row are integrated to determine the update matrix M.

The pseudocode of the second embodiment is similar to the pseudocode illustrated in FIGS. 4A and 4B, except that the description portion 1221*cd* is changed to the description portion 1221*cf*.

As described above, in the inverse element arithmetic apparatus 1 in the second embodiment, when both a and b are odd numbers in the first loop, the inverse element arithmetic apparatus 1 updates r and a based on the magnitude relationship of m and n without using the magnitude relationship of r and s. This makes it possible to reduce the load on the magnitude determination processing and reduce the critical path delay. Therefore, it is possible to reduce the circuit scale when the inverse element arithmetic apparatus 1 is implemented in a hardware form as compared with the case where the magnitude determination of r and s is performed.

Third Embodiment

Next, the inverse element arithmetic apparatus 1 according to a third embodiment will be described. In the following, portions different from the first embodiment and the second embodiment will be mainly described.

Although the correction process is performed in the processing of multiple precision unit in the first embodiment, the correction process in the third embodiment is performed as processing in word unit. By replacing the multiple precision unit processing that may include carry-up or carry-down exchanges between a plurality of arithmetic devices with word-unit processing not including such exchanges, it is possible to reduce the number of processing cycles. This makes it possible to reduce the load of the inverse element arithmetic process, leading to the reduction of the total arithmetic time.

Figure 8:
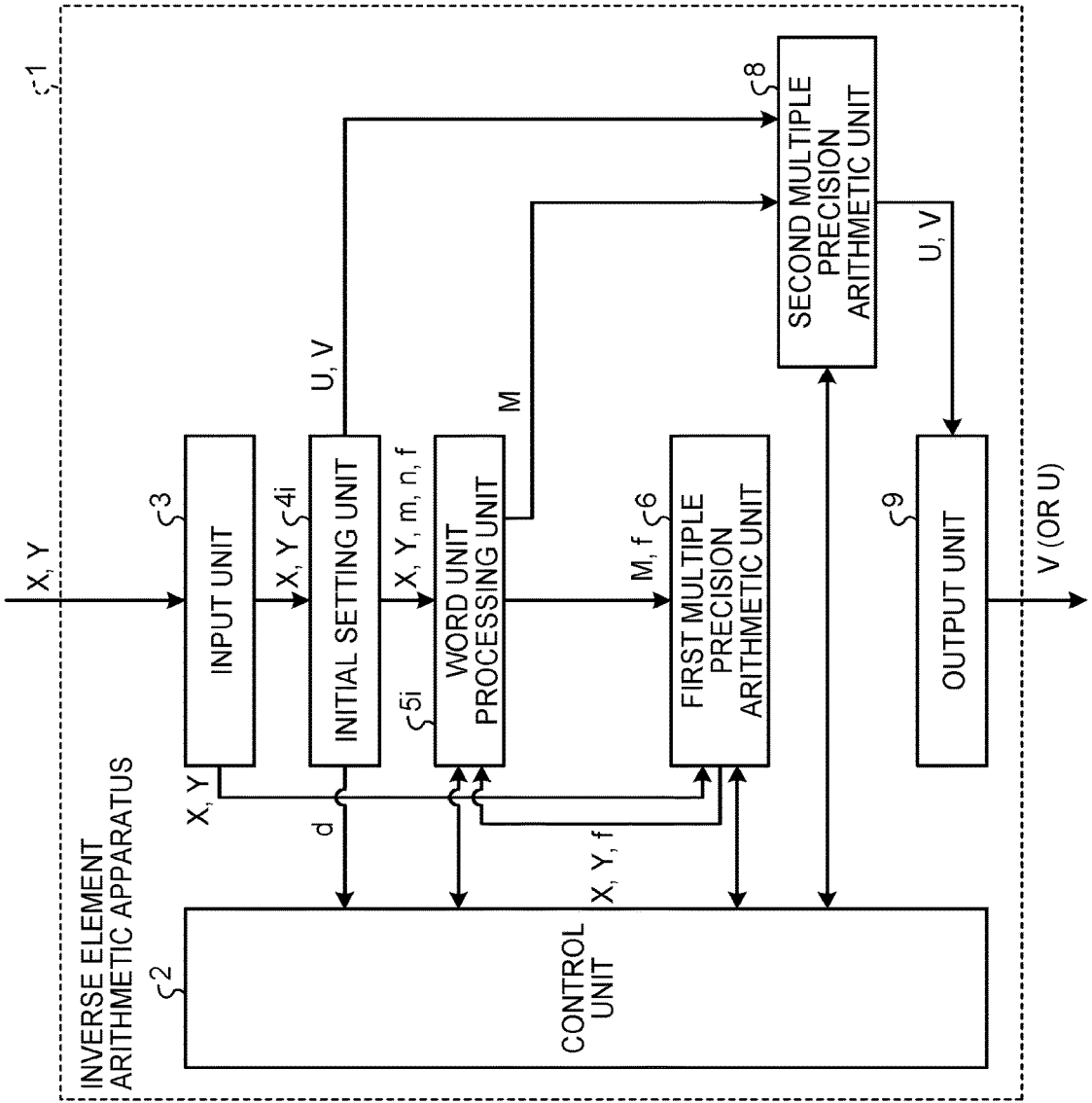
FIG. 8 is a diagram illustrating a configuration of the inverse element arithmetic apparatus according to a third embodiment.

Specifically, as illustrated in FIG. 8, the inverse element arithmetic apparatus 1 has no correction unit 7 (refer to FIG. 2) and includes an initial setting unit 4i, a word unit processing unit 5i instead of the initial setting unit 4 and the word unit processing unit 5, respectively.

The initial setting unit 4i generates f indicating positive/negative of X and Y. f is a variable that indicates positive/negative of X and Y. Specifically, when f is a value of 0, X (or Y) indicates positive, and when f is a value of 1, X (or Y) indicates negative. For example, when generating f, the initial setting unit 4i sets 0 as an initial value of f. The initial setting unit 4i supplies f to the word unit processing unit 5i.

The word unit processing unit 5i performs correction process of updating r, s, a, b, and M so that the values of r, s, a, and b are non-negative based on f. Based on f, the word unit processing unit 5i performs bit inversion of r and s and sign inversion of a and b to update r, s, a, and b. When f=0, the word unit processing unit 5i will not update r, s, a, or b. When f≠0, the word unit processing unit 5i will perform bit inversion of r and s and sign inversion of a and b to update r, s, a, and b, and will determine the update matrix M accordingly. This makes it possible to approximately determine the update matrix M with non-negative r, s, a, and b. Moreover, the word unit processing unit 5i iterates through the loop of the extended binary GCD process until the loop number of times reaches w, and thereafter updates the update matrix M. The word unit processing unit 5i supplies the updated M and f to the first multiple precision arithmetic unit 6, and supplies the updated M to the second multiple precision arithmetic unit 8.

When M and f have been input from the word unit processing unit 5i, the first multiple precision arithmetic unit 6 updates the values of X and Y based on the update matrix M, and then updates f based on the positive/negative of X and Y. The first multiple precision arithmetic unit 6 supplies the updated X and Y and the updated f to the word unit processing unit 5i.

Furthermore, when the operation of the inverse element arithmetic apparatus 1 is represented by pseudocodes, Description 124 illustrated in FIG. 9A is divided into a plurality of Descriptions 124a and 124b illustrated in FIG. 9B, so as to be distributed in Description 11" and Description 121" of Description 12". FIG. 9A is a diagram schematically illustrating the pseudocode of the first embodiment illustrated in FIG. 4. FIG. 9B is a diagram schematically illustrating the pseudocode of the third embodiment, and is a diagram illustrating a modified portion of the pseudocode of the third embodiment from the pseudocode of the first embodiment.

In Description 124a in Description 11", f indicating the positive/negative of X and Y is generated, and f is set to 0 as an initial value.

In Description 124b in Description 121" of Description 12", correction process is performed to turn negative Y to positive Y. This processing is described as a conditional part of f≠0 in the "if" statement, in which f≠0 (that is, when f=1) indicates negative Y and then, the correction process is performed correspondingly. In the correction process, bit inversion of r and s and sign inversion of a and b are performed to update r, s, a and b, and the update matrix M is updated accordingly. The r and s that have undergone bit inversion can be approximately regarded as r and s that have undergone sign inversion. That is, in Description 124b, when f≠0, it is possible to perform processing corresponding to approximately performing the sign inversion of Y with the approximate variables r, s, a, and b.

Furthermore, as illustrated in FIG. 10, operations of the inverse element arithmetic apparatus 1 include processing different from the case of the first embodiment in the following points. FIG. 10 is a flowchart illustrating operations of the inverse element arithmetic apparatus 1.

In the inverse element arithmetic apparatus 1, the initial setting unit 4i performs generation of f indicating positive/negative of X and Y and setting of the initial value of f, in addition to the initial setting similar to S1 (S101). Thereafter, the control unit 2 iterates through a loop (S110) of the inverse element arithmetic process corresponding to Description 12 until the loop number of times reaches d. In the loop (S110) of the inverse element arithmetic process, the control unit 2 compares the loop number of times of the inverse element arithmetic process with the number-of-times threshold d. The control unit 2 performs S111, S12, and S14 when the loop number of times is the number-of-times threshold d or less. That is, the correction process corresponding to S13 is performed in S111, rather than after S12.

In the word unit processing (S111), the word unit processing unit 5 performs word unit initialization corresponding to Description 121" (refer to FIG. 9B) (S3"). That is, in addition to initialization processing similar to S3 (refer to FIG. 6), the word unit processing unit 5i performs correction process of updating r, s, a, b, and M so that the values of r, s, a, and b are non-negative based on f. Thereafter, the word unit processing unit 5 performs the processing similar to S20 in FIG. 6.

As described above, in the third embodiment, the inverse element arithmetic apparatus 1 performs the correction process in word unit processing. This may reduce the number of processing cycles and thus may reduce the load of the inverse element arithmetic process, leading to the reduction of the total arithmetic operation time.

Fourth Embodiment

Next, the inverse element arithmetic apparatus 1 according to a fourth embodiment will be described. In the following, portions different from the first to third embodiments will be mainly described.

The first to third embodiments have exemplified the operation in which the word unit processing, the first multiple precision arithmetic operation, and the second multiple precision arithmetic operation are sequentially performed for each of loops of the inverse element arithmetic process. However, the fourth embodiment includes execution of a pipeline operation in which the second multiple precision arithmetic operation of a certain loop and the word unit processing of the next loop are executed in parallel.

This pipeline operation will be described with reference to the sequence diagram of FIG. 11A. When N is an arbitrary non-negative integer smaller than d, word unit processing (S11-N), the first multiple precision arithmetic operation (S12-N), and the second multiple precision arithmetic operation (S14-N) are performed sequentially in the loop of the N-th inverse element arithmetic process (S10-N). FIG. 11A is a sequence diagram illustrating an inverse element arithmetic process. The word unit processing (S11-(N+1)), the first multiple precision arithmetic operation (S12-(N+1)), and the second multiple precision arithmetic operation (S14-(N+1)) are performed sequentially in the loop of the (N+1)- th inverse element arithmetic process (S10-(N+1)). The word unit processing (S11-(N+2)), the first multiple precision arithmetic operation (S12-(N+2)), and the second multiple precision arithmetic operation (S14-(N+2)) are performed sequentially in the loop of the (N+2)-th inverse element arithmetic process (S10-(N+2)).

At this time, as illustrated by the one-dot chain line in FIG. 11A, the word unit processing (S11-(N+1)) of the loop of the (N+1)-th inverse element arithmetic process and the second multiple precision arithmetic operation (S14-N) of the loop of the Nth inverse element arithmetic process are performed in parallel. Similarly, the word unit processing (S11-(N+2)) of the (N+2)-th inverse element arithmetic operation loop and the second multiple precision arithmetic operation (S14-(N+1)) of the (N+1)-th inverse element arithmetic operation loop are performed in parallel.

Correspondingly, as illustrated by dotted arrows in FIG. 11A, an execution period T-N of the N-th inverse element arithmetic process and an execution period T-(N+1) of the (N+1)-th inverse element arithmetic process are partially overlap each other. The execution period T-(N+1) of the (N+1)-th inverse element arithmetic process and an execution period T-(N+2) of the (N+2)-th inverse element arithmetic process partially overlap each other.

This pipeline operation will be explained with the pseudocode of FIGS. 4A and 4B. When N is an arbitrary integer smaller than d, multiple precision calculation of U and V in Description 125 in the loop (loop_j) of the N-th inverse element arithmetic process and the loop (loop_i) of approximate calculation in 122 in the loop of the (N+1)-th inverse element arithmetic process (loop_j) are performed in parallel (FIG. 4A and FIG. 4B). That is, the calculation results of U and V would not affect the processing of the next loop_i, making it possible to start the processing of the next loop_i without waiting for the completion of the calculation of U and V.

As described above, in the fourth embodiment, the inverse element arithmetic apparatus 1 performs pipeline operation in which the second multiple precision arithmetic operation of the loop of the inverse element arithmetic process and the word unit processing of the loop of the next inverse element arithmetic process are executed in parallel. This enables efficient use of the hardware and speed-up of the arithmetic operations, leading to the reduction of the overall processing time.

It should be noted that the inverse element arithmetic apparatus 1 may control to execute the first multiple precision arithmetic operation and the second multiple precision arithmetic operation in time division by using a common circuit. That is, the U and V multiple precision calculation (first multiple precision arithmetic operation) and the X and Y multiple precision calculation (second multiple precision arithmetic operation) are described in pseudocodes illustrated in FIGS. 11B and 11C, respectively. As illustrated by the portion surrounded by the dotted line in FIGS. 11B and 11C, the multiple precision calculation for U and V and the multiple precision calculation for X and Y are similar to each other in processing content, and thus may be processed in time division by using a common multiplier (shift operator). This enables efficient use of the hardware, leading to the reduction of the circuit scale.

The validity of the first to third embodiments may be proved as follows by using FIGS. 12, 13A, and 13B. FIG. 12 is a diagram illustrating a pseudocode of inverse element arithmetic process (algorithm G) corresponding to the extended binary GCD method. FIGS. 13A and 13B are diagrams illustrating a pseudocode (algorithm A) in which an intermediate variable for proof has been added to the pseudocode of FIG. 4.

It should also be noted that the following will prove that the inverse element arithmetic process (algorithm A) of the first embodiment is equivalent to the inverse element arithmetic process (algorithm G) corresponding to the extended binary GCD method. Furthermore, the following also outlines that the inverse element arithmetic process (algorithm B) of the second embodiment and the inverse element arithmetic process (algorithm C) of the third embodiment are equivalent to algorithm G similarly.

First, lemmas (Lemma 1) to (Lemma 3) and theorems (Theorem 4) to (Theorem 6) to be proved are illustrated, and then they will be proved in the proofs (Proof 1) to (Proof 6).

Let $\delta_i = X'_i / 2^h - r_i$, $|\varepsilon_i = Y'_i / 2^h - s_i$. (Lemma 1)

For $i < c$,

·L1.1 $|\delta_i - \varepsilon_i| < 2^t$

·L1.2 $e_i = 0$ and $r_i > s_i \Rightarrow X'_i > Y'_i$

·L1.3 $e_i = 0$ and $r_i < s_i \Rightarrow X'_i < Y'_i$

·L1.4 $e_i = 0 \Rightarrow M_i = M'_i$

L1.5 $e_i \neq 0 \Rightarrow M_i = M'_i$ or $M_i = \begin{pmatrix} 1 & 0 \\ 0 & -1 \end{pmatrix} M'_i$ For $i < w$, (Lemma 2)

·L2.1 $m_i + n_i > 1 \Rightarrow m_{i+1} + n_{i+1} = m_i + n_i - 1$

·L2.2 $\min(m_{i+1}, n_{i+1}) \leq \min(m_i, n_i)$

If $l = \min(m_0, n_0)$,

·L2.3 $m_i + n_i = k + l - i$

For $i \leq c - e$, (Lemma 3)

L3.1 $0 \leq X_i < 2^{m_i}$

L3.2 $0 \leq Y_i < 2^{n_i}$

For $i = c$, $|e - l$,

·L3.3 $0 \leq X_c < 2^l$

·L3.4 $|Y_c| < 2^{k-w}$

For $i = w$,

L3.5 $0 \leq X_c < 2^{m_w}$

L3.6 $|Y_c| < 2^{n_w}$ (Theorem 4)

When algorithm G is executed using a value of c for the time of execution of algorithm A, the processing of algorithm A and algorithm G are equivalent. That is, The update processing in L4.1 loop_j are equivalent.

The end conditions of L4.2 loop_j are equivalent.

(Theorem 5)

The processing of algorithm B and algorithm G are equivalent.

(Theorem 6)

The processing of algorithm C and algorithm G are equivalent.

(Proof 1)

Using induction regarding i.

$$|\delta_i - \varepsilon_i| < 2^t \quad \text{L1.1}$$

When i=0

Since $r_0 = X[k-1:h]$, $$0 \leq X_0 - r_0 \cdot 2^h < 2^h$$

$$0 \leq X_0 / 2^h i - r_0 < 1$$

$$0 \leq \delta_0 < 1$$

Similarly, $0 \leq \delta_0 < 1$

Therefore, $|\delta_0 - \varepsilon_0| < 1$

When i>0,
In algorithm A, $$\binom{r_i}{s_i} = M_{i-1}\binom{r_{i-1}}{s_{i-1}} - \binom{0}{q_{i-1}/2}$$

In algorithm G, $$\binom{X'_i}{Y'_i} = M'_{i-1}\binom{X'_{i-1}}{Y'_{i-1}}$$

Since $M_{i-1} = M'_{i-1}$ from the assumption of induction, $$\binom{X'_i}{Y'_i} = M_{i-1}\binom{X'_{i-1}}{Y'_{i-1}}$$

At this time, $$\binom{\delta_i}{\varepsilon_i} = 2^{-h}\binom{X'_i}{Y'_i} - \binom{r_i}{s_i} =$$

$$2^{-h}M_{i-1}\binom{X'_{i-1}}{Y'_{i-1}} - M_{i-1}\binom{r_{i-1}}{s_{i-1}} + \binom{0}{q_{i-1}/2} = M_{i-1}\binom{\delta_{i-1}}{\varepsilon_{i-1}} + \binom{0}{q_{i-1}/2}$$

Taking the $L_\infty$ norm and focusing on $|\delta_0| < 1$, $|\varepsilon_0| < 1$, $$\left\|\binom{\delta_i}{\varepsilon_i}\right\|_\infty \leq \|M_{i-1}\|_\infty \left\|\binom{\delta_{i-1}}{\varepsilon_{i-1}}\right\|_\infty + \left\|\binom{0}{q_{i-1}/2}\right\|_\infty \leq \left\|\binom{\delta_{i-1}}{\varepsilon_{i-1}}\right\|_\infty + 1/2$$

$$\vdots$$

$$\leq \left\|\binom{\delta_0}{\varepsilon_0}\right\|_\infty + \frac{i}{2} < \frac{i+2}{2}$$

Therefore $$|\delta_i - \varepsilon_i| \leq |\delta_i| + |\varepsilon_i| \leq 2\left\|\binom{\delta_1}{\varepsilon_1}\right\|_\infty < i+2$$

Therefore, $t \geq \lceil \log_2(i+2) \rceil$

Then, $|\delta_i - \varepsilon_i| < 2^t$ holds.

$e_i = 0$ and $r_i > s_i \Rightarrow X'_i > Y'_i$     L1.2

From $e_i = 0$, $|r_i - s_i| \geq 2^t$ holds. From $r_i > s_i$, $r_i - s_i \geq 2^t$ holds. From L1.1 $|\delta_i - \varepsilon_i| < 2^t$ that is, $\delta_i - \varepsilon_i > -2^t$ holds, $(X'_i - Y'_i)/2^h = (r_i + \delta_i) - (s_i + \varepsilon_i) = (r_i - s_i) \pm (\delta_i - \varepsilon_i) > 2^t + (-2^t) = 0$ Therefore, $X'_i > Y'_i$ $e_i = 0$ and $r_i < s_i \Rightarrow X'_i < Y'_i$     L1.3

From $e_i = 0 |r_i - s_i| \geq 2^t$, from $r_i < s_i$ $r_i - S_i \leq -2^t$, from L1.1 $|\delta_i - \varepsilon_i| < 2^t$, that is, $\delta_i - \varepsilon_i > -2^t$ $(X'_i - Y'_i)/2^h = (r_i + \delta_i) - (s_i + \varepsilon_i) = (r_i - s_i) + (\delta_i - \varepsilon_i) < (-2^t) + 2^t = 0$ Therefore, $X'_i < Y'_i$ $e_i = 0 \Rightarrow M_i = M'_i$     L1.4

From the induction assumption, the determination in the preceding iteration is assumed to be equal in algorithm G and algorithm A.

Since the LSB of $X'_i$ and the LSB of $a_i$ have the same value, the conditions for case_A are the same.

Since the LSB of $Y'_i$ and the LSB of $b_i$ are the same value, the conditions for case_B are the same.

From L1.2, the conditions for case_C are the same.
From L1.3, the conditions for case_D are the same.
From the above, all the determinations are equal, so $M_i = M'_i$ holds.

$$L1.5 \quad e_i \neq 0 \Rightarrow M_i = M'_i \text{ or } M_i = \begin{pmatrix} 1 & 0 \\ 0 & -1 \end{pmatrix}M'_i$$

When $e_i \neq 0$, there is a possibility of having a mistake in selection of case_C and case_D. If there is $n_0$ mistake in selection, $M_i = M'_i$ holds. If there is a mistake, the result would be:

$$M_i = \begin{pmatrix} 1 & 0 \\ 0 & -1 \end{pmatrix}M'_i$$

(Proof 2)

$m_i + n_i > 1 \Rightarrow m_{i+1} + n_{i+1} = m_i + n_i - 1$     L2.1

$\min(m_{i+1}, |n_{i+1}|) \leq \min(m_i, |n_i|)$     L2.2

From the update formula of $m_i$, $|n_i|$, it is known that, except when case_B is selected and $n_i = 0$, the value of $m_i + n_i$ always decreases by 1 and the value of $\min(m_i, |n_i|)$ never increases.

When case_B is selected and $n_i = 0$, the result would be such that $m_i = 1$, $n_i = 0$, that is, $m_i + n_i = 1$. This is because if $m_i$ is even, case_A is selected, and if $m_i$ is odd other than 1, it means that X and Y have common divisors other than 1, which has $n_0$ possibility of occurrence.

$\cdot L2.3 \quad m_i + n_i = k + 1 - i$ $m_i + n_i = m_{i-1} + n_{i-1} - 1 = m_{i-2} + n_{i-2} - 2$ $\vdots$ $= m_0 + n_0 - i = \max(m_0, n_0) + \min(m_0, n_0) - i = k + 1 - i$ (Proof 3)

$0 \leq X_i < 2^{m_i}$     L3.1

$0 \leq Y_i < 2^{n_i}$     L3.2

This can be illustrated by induction.

$0 \leq X_c < 2^t$     L3.3

$|Y_c| < 2^{k-w}$     L3.4

From e=1, either case_C or case_D is selected when i=c−1. In the following, case_C is assumed and the proof is continued with $m_{c-1} > n_{c-1}$, although case_D can also be proved in the similar manner.

From $m_{c-1} > n_{c-1}, n_{c-1} = \min(m_{c-1}, |n_{c-1}|)$

From Lemma 2, $\min(m_{c-1}, n_{c-1}) \leq \min(m_{c-2}, n_{c-2}) \leq \ldots \leq \min(m_0, n_0) = 1$ So, $n_{c-1} \leq 1$ From L3.1

$0 \leq Y_{c-1} < 2^{n_{c-1}}$

So, $0 \leq X_C = Y_{C-1} < 2^{n_{c-1}} \leq 2^l$

From $Y_c = (X_{c-1} - Y_{c-1})/2$, $|Y_c| = |(X_{c-1} - Y_{c-1})/2| = |2^h(r_{c-1} - s_{c-1}) + (\delta_{c-1} - \varepsilon_{c-1}))/2| \leq$
$2^h(|r_{c-1} - s_{c-1}|) + |\delta_{c-1} - \varepsilon_{c-1}|)/2 < 2^h(2^t + 2^t)/2 = 2^{h+t} = 2^{k-w}$ $0 \leq X_c < 2^{m_w}$      L3.5

$|Y_c| < 2^{m_w}$      L3.6

When e=0, c=w holds and this is already covered by L3.1 and L.3.2. Accordingly, the case when e=1 will be proved. Hereafter, it is assumed that case_C is selected when i=c−1, although proof is possible similarly when case_D is selected.

From the update formula of case_2, $n_w \geq k_w$. From L3.4, $|Y_c| < 2^{k-w}$, and therefore, $|Y_c| < 2^{k-w} \leq 2^{n_w}$ When $n_c - (w-c) \geq k-w$, $m_w = m_c$ holds from the update formula of case_2.

$0 \leq X_c = Y_{c-1} < 2^{n_{c-1}} = 2^{m_c} = 2^{m_w}$

When $n_c - (w-c) < k-w$, according to the update formula of case_2 and L2.3, $m_w =$
$m_c - ((w-c) - (n_c - (k-w))) = m_c + n_c + c - k = (k+1-c) + c - k = 1$ From L3.3, $0 \leq X_c = 2^l = 2^{m_w}$ (Proof 4)
The update processing in L4.1 loop_j are equivalent.
From L1.4 and L1.5, M=M' or the following holds:

$M = \begin{pmatrix} 1 & 0 \\ 0 & -1 \end{pmatrix} M'$

In the latter case, $Y = Y_c < 0$ temporarily. However, then f=1, and correction is made such that:

$Y = -Y, M = \begin{pmatrix} 1 & 0 \\ 0 & -1 \end{pmatrix} M$

Therefore, the update processing is equivalent.
The end conditions of L4.2 loop_j are equivalent.
In Algorithm A, each time loop_j is iterated based on L2.1, the value of m+n decreases by w within a range not less than 1. Therefore, m+n=1 always holds after iterations through loop_j d times. In the update formula of $m_i$ and $n_i$, $m_i$=0 never occurs. Therefore, n=0 holds when m+n=1. At this time, from L3.2, the result is $0 \leq Y < 2^n = 2^0 = 1$, that is, Y=0. In some cases, Y=0 holds before iteration of d times, but in that case, case_B continues to be selected with no change in the values of X and Y. Therefore, the end conditions of loop_j are considered to be equivalent.

(Proof 5)
In algorithm B, case_C and case_D are transformed with respect to algorithm A. This will increase patterns of $M_i$, which all satisfy the following:

$\|M_i\|_\infty = 1$

Accordingly, it can be demonstrated that it is equivalent to algorithm G similarly to the above.

(Proof 6)
In algorithm C, the values of $s_0$ might be different from algorithm A. This leads to the possibility of $\varepsilon_0 = 1$, which leads to $|\delta_i - \varepsilon_i| \leq i+2$. Therefore, by determining t based on this equation, it is possible to demonstrate that the result is equivalent to the extended binary GCD method similarly to the above.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An inverse element arithmetic apparatus comprising:
    an initial setting unit that receives input of X and Y and that generates m, n and a number-of-times threshold, X and Y representing relatively prime integers, X and Y being used for inverse element arithmetic process, the inverse element arithmetic process being a process of finding U and V satisfying UX+VY=1, m and n indicating effective bit lengths of X and Y, the number-of-times threshold being a threshold determined in accordance with a sum of m and n;
    a word unit processing unit that receives input of X, Y, m and n, that generates r, s, a and b in accordance with m and n when w and t are predetermined integers, that, as an approximate calculation loop for extended binary GCD process, iterates a first loop in a case where a value of |r−s| is a subtraction threshold or more, and is capable of iterating a second loop instead of the first loop in a case where the value of |r−s| is smaller than the subtraction threshold, and that terminates the loop of the extended binary GCD process in a case where a total loop number of times of the first loop and the second loop reaches w, m and n being generated in the initial setting unit, r and s indicating high-order w+t bits of X and Y, a and b indicating low-order w bits of X and Y, in the first loop values of r, s, a, b, m, and n being updated and an update matrix M being generated or updated, in the second loop the values of m and n being updated without updating the values of r, s, a, and b as well as the update matrix M;

a first multiple precision arithmetic unit that receives input of X and Y, receives the update matrix M updated by the word unit processing unit, updates the values of X and Y based on the update matrix M, and generates or updates f based on positive/negative of X and Y;

a correction unit that receives input of X, Y, and f updated by the first multiple precision arithmetic unit and input of the update matrix M updated by the word unit processing unit, and updates the X, Y, and M so that the values of X and Y are non-negative based on f;

a second multiple precision arithmetic unit that receives input of the update matrix M updated by the correction unit, and updates the values of U and V based on the update matrix M;

a control unit that receives input of the number-of-times threshold generated by the initial setting unit, iterates a loop of the inverse element arithmetic process that sequentially operates the word unit processing unit, the first multiple precision arithmetic unit, the correction unit, and the second multiple precision arithmetic unit, and terminates the loop of the inverse element arithmetic process in a case where a loop number of times of the inverse element arithmetic process reaches the number-of-times threshold; and an output unit that outputs $V=Y^{-1}$ mod X as an inverse element on a quotient ring Z/XZ in response to the termination of the loop of the inverse element arithmetic process.

2. The inverse element arithmetic apparatus according to claim 1,
wherein, when both a and b are odd numbers in the first loop, the word unit processing unit updates r and a based on a magnitude relationship of m and n without using a magnitude relationship of r and s.

3. The inverse element arithmetic apparatus according to claim 2,
wherein a bit number of m and n is smaller than a bit number of r and s.

4. The inverse element arithmetic apparatus according to claim 1,
wherein the control unit controls the word unit processing unit and the second multiple precision arithmetic unit to operate in parallel to each other.

5. The inverse element arithmetic apparatus according to claim 4,
wherein, when N is an arbitrary non-negative integer smaller than d, the control unit controls to perform processing of the word unit processing unit in a loop of (N+1)-th inverse element arithmetic process and processing of the second multiple precision arithmetic unit in a loop of N-th inverse element arithmetic process, in parallel to each other.

6. The inverse element arithmetic apparatus according to claim 1,
wherein the control unit controls to execute processing of the first multiple precision arithmetic unit and processing of the second multiple precision arithmetic unit in time division by using a common circuit.

7. The inverse element arithmetic apparatus according to claim 1,
wherein w is a bit number of one word length, and the initial setting unit generates the number-of-times threshold by an integer obtained by rounding up a fractional part of (m+n−1)/w.

8. The inverse element arithmetic apparatus according to claim 1,
wherein w is a bit number of one word length, and t is predetermined as an integer obtained by rounding up a fractional part of $\log_2(w+2)$.

9. The inverse element arithmetic apparatus according to claim 8,
wherein the subtraction threshold is $2^t$.

10. A memory system comprising:
memory that stores firmware; and
a controller that includes the inverse element arithmetic apparatus according to claim 1, and that is configured to perform signature verification process including inverse element arithmetic operation by the inverse element arithmetic apparatus when reading the firmware from the memory.

11. A memory system comprising:
memory that stores firmware; and
a controller that includes the inverse element arithmetic apparatus according to claim 1, and that is configured to perform signature grant processing including inverse element arithmetic operation by the inverse element arithmetic apparatus when reading the firmware from the memory.

12. An inverse element arithmetic apparatus comprising:
an initial setting unit that receives input of X and Y and that generates m, n, a number-of-times threshold and f, X and Y representing relatively prime integers, X and Y being used for inverse element arithmetic process, the inverse element arithmetic process being a process of finding U and V satisfying UX+VY=1, m and n indicating effective bit lengths of X and Y, the number-of-times threshold being a threshold determined in accordance with a sum of m and n, f indicating positive/negative of X and Y;

a word unit processing unit that receives input of X, Y, m, n, and f, that generates r, s, a and b in accordance with m and n when w and t are predetermined integers, that performs correction process, that, as an approximate calculation loop for extended binary GCD process, iterates a first loop in a case where a value of |r−s| is greater than a first threshold and a second loop instead of the first loop in a case where the value of |r−s| is smaller than the first threshold, and that terminates the loop of the extended binary GCD process in a case where a total loop number of times of the first loop and the second loop reaches w, m, n, f being generated in the initial setting unit, r and s indicating high-order w+t bits of X and Y, a and b indicating low-order w bits of X and Y, correction process being a process of updating r, s, a, b, and M so that the values of r, s, a, and b are non-negative based on f, in the first loop values of r, s, a, b, m, and n being updated and an update matrix M being generated or updated, the first threshold being a threshold where high-order bit of |r−s| becomes 0, in the second loop the values of m and n being updated without updating the values of r, s, a, and b as well as the update matrix M;

a first multiple precision arithmetic unit that receives input of X and Y, receives input of f used in the word unit processing unit and the update matrix M updated by the word unit processing unit, updates the values of X and Y based on the update matrix M, and updates f based on positive/negative of X and Y;

a second multiple precision arithmetic unit that receives input of the update matrix M updated by the word unit processing unit and that updates the values of U and V based on the update matrix M;

a control unit that receives input of the number-of-times threshold generated by the initial setting unit, iterates a loop of the inverse element arithmetic process that sequentially operates the word unit processing unit, the first multiple precision arithmetic unit, and the second multiple precision arithmetic unit, and terminates the loop of the inverse element arithmetic process in a case where a loop number of times of the inverse element arithmetic process reaches the number-of-times threshold; and an output unit that outputs $V=Y^{-1} \bmod X$ as an inverse element on a quotient ring Z/XZ in response to the termination of the loop of the inverse element arithmetic process.

13. The inverse element arithmetic apparatus according to claim 12,
wherein the word unit processing unit performs bit inversion of r and s and sign inversion of a and b based on f to update r, s, a, and b.

14. The inverse element arithmetic apparatus according to claim 12,
wherein the control unit controls the word unit processing unit and the second multiple precision arithmetic unit to operate in parallel to each other.

15. The inverse element arithmetic apparatus according to claim 14,
wherein, when N is an arbitrary non-negative integer smaller than d, the control unit controls to perform processing of the word unit processing unit in a loop of (N+1)-th inverse element arithmetic process and processing of the second multiple precision arithmetic unit in a loop of N-th inverse element arithmetic process, in parallel to each other.

16. The inverse element arithmetic apparatus according to claim 12,
wherein the control unit controls to execute processing of the first multiple precision arithmetic unit and processing of the second multiple precision arithmetic unit in time division by using a common circuit.

17. The inverse element arithmetic apparatus according to claim 12,
wherein w is a bit number of one word length, and
the initial setting unit generates the number-of-times threshold by an integer obtained by rounding up a fractional part of $(m+n-1)/w$.

18. The inverse element arithmetic apparatus according to claim 12,
wherein w is a bit number of one word length, and
t is predetermined as an integer obtained by rounding up a fractional part of $\log_2(w+2)$.

19. The inverse element arithmetic apparatus according to claim 18,
wherein the subtraction threshold is $2^t$.

20. A memory system comprising:
memory that stores firmware; and
a controller that includes the inverse element arithmetic apparatus according to claim 12, and that is configured to perform signature verification process including inverse element arithmetic operation by the inverse element arithmetic apparatus when reading the firmware from the memory.

* * * * *